(12) United States Patent
Shi et al.

(10) Patent No.: US 12,645,685 B2
(45) Date of Patent: Jun. 2, 2026

(54) STRUCTURED QUERY STATEMENT SIMILARITY DETECTION METHOD AND APPARATUS, AND DEVICE

(71) Applicant: Beijing Volcano Engine Technology Co., Ltd., Beijing (CN)

(72) Inventors: Qundong Shi, Beijing (CN); Yi Zhan, Beijing (CN); Shuang Li, Beijing (CN); Xiaoming Yin, Beijing (CN); Yang Sun, Beijing (CN); Jiajun Xie, Beijing (CN); Ke Sun, Los Angeles, CA (US)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/939,343

(22) Filed: Nov. 6, 2024

(65) Prior Publication Data

US 2025/0181594 A1     Jun. 5, 2025

(30) Foreign Application Priority Data

Nov. 30, 2023    (CN) .......................... 202311628927.5

(51) Int. Cl.
G06F 16/24      (2019.01)
G06F 16/22      (2019.01)
G06F 16/2457    (2019.01)
(52) U.S. Cl.
CPC .... G06F 16/24578 (2019.01); G06F 16/2246 (2019.01)
(58) Field of Classification Search
CPC ....................... G06F 16/24578; G06F 16/2246
See application file for complete search history.

(56) References Cited

U.S. PATENT DOCUMENTS

| | | | |
|---|---|---|---|
| 10,540,350 B2 * | 1/2020 | Fontenot | ................. G06F 8/427 |
| 11,558,418 B2 * | 1/2023 | Jas | .................... G06F 16/24565 |

(Continued)

FOREIGN PATENT DOCUMENTS

| | | |
|---|---|---|
| CN | 102023921 A | 4/2011 |
| CN | 105975392 A | 9/2016 |

(Continued)

OTHER PUBLICATIONS

China National Intellectual Property Administration, Office Action and Search Report Issued in Application No. 202311628927.5, Nov. 28, 2025, 19 pages.

(Continued)

*Primary Examiner* — Alicia M Willoughby
(74) *Attorney, Agent, or Firm* — Alleman Hall LLP

(57)         ABSTRACT

A structured query statement similarity detection method, a device and a medium are provided. The method includes: acquiring first and second structured query statements, and constructing corresponding first and second abstract syntax trees, a correlation degree between the root node in the abstract syntax tree and the query result of the statement being higher than a correlation degree between other nodes and the query result of the statement; traversing a node in the first abstract syntax tree, matching the traversed node with a node at a same level in the second abstract syntax tree, and obtaining a matching result of the node; and determining a statement similarity between the first structured query statement and the second structured query statement based on a matching result of a root node in the first abstract syntax tree, a matching result of a child node of the root node, and their corresponding weights.

20 Claims, 7 Drawing Sheets

(56) References Cited

U.S. PATENT DOCUMENTS

| | | | |
|---|---|---|---|
| 2011/0318724 A1* | 12/2011 | Labine .................... | G09B 7/08 |
| | | | 434/350 |
| 2015/0046492 A1* | 2/2015 | Balachandran ........... | G06F 8/36 |
| | | | 707/772 |
| 2016/0239487 A1* | 8/2016 | Potharaju .......... | G06F 16/24578 |
| 2019/0163781 A1* | 5/2019 | Ackermann ........ | G06F 16/2425 |
| 2019/0207974 A1* | 7/2019 | Jas .................... | G06F 16/24565 |
| 2021/0034616 A1* | 2/2021 | Kiebler .............. | G06F 16/2453 |
| 2023/0289151 A1* | 9/2023 | Groenewegen ......... | G06F 8/751 |

FOREIGN PATENT DOCUMENTS

| | | |
|---|---|---|
| CN | 109635569 B | 11/2020 |
| CN | 115729797 A | 3/2023 |
| CN | 116303574 A | 6/2023 |
| CN | 117130932 A | 11/2023 |
| WO | 2020259260 A1 | 12/2020 |

OTHER PUBLICATIONS

China National Intellectual Property Administration, Notice of Allowance Issued in Application No. 202311628927.5, Mar. 9, 2026, 10 pages.

Huang, X, et al., "Software Defect Prediction via Heavy Son Node-based Abstract Syntax Tree", Computer Engineering, vol. 47 No. 12, Dec. 2021, 7 pages. (Contains English Abstract).

Spirin, E. et al., "Psiminer: A Tool for Mining Rich Abstract Syntax Trees from Code", Proceedings of 29th IEEE/ACM International Conference on Program Comprehension (ICPC), May 20, 2021, Madrid, Spain, 5 pages.

* cited by examiner

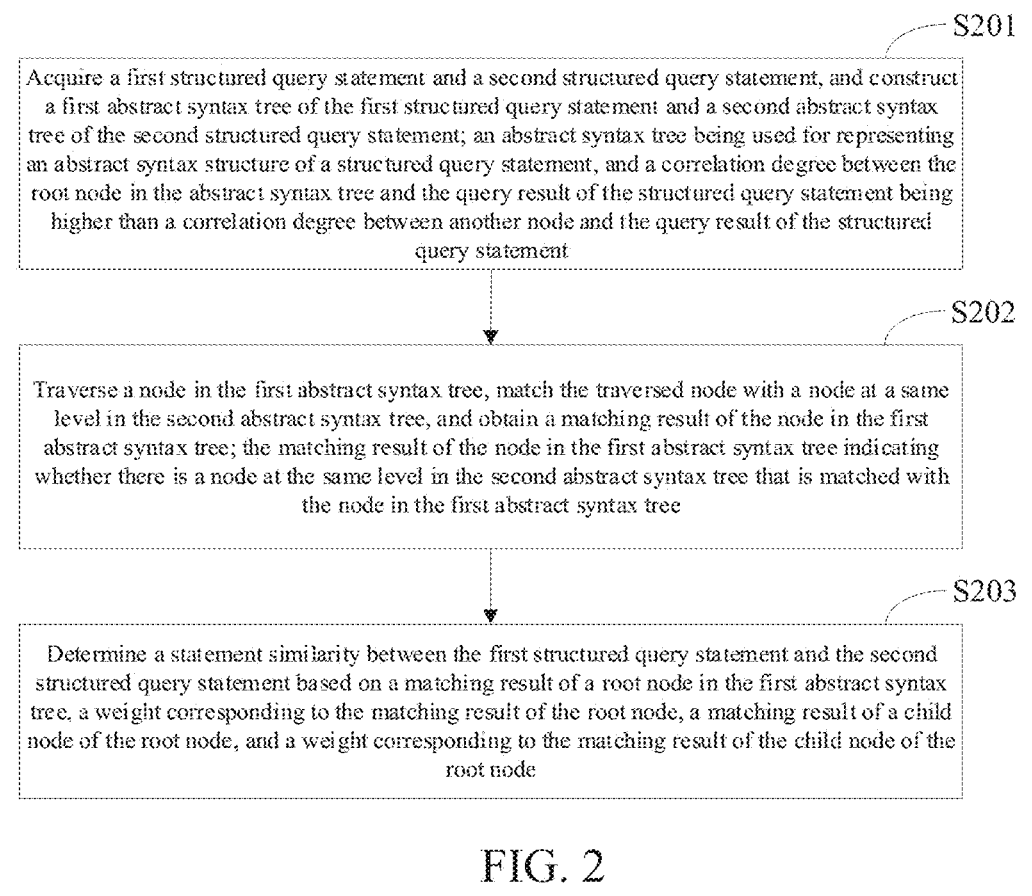

S201

Acquire a first structured query statement and a second structured query statement, and construct a first abstract syntax tree of the first structured query statement and a second abstract syntax tree of the second structured query statement; an abstract syntax tree being used for representing an abstract syntax structure of a structured query statement, and a correlation degree between the root node in the abstract syntax tree and the query result of the structured query statement being higher than a correlation degree between another node and the query result of the structured query statement

S202

Traverse a node in the first abstract syntax tree, match the traversed node with a node at a same level in the second abstract syntax tree, and obtain a matching result of the node in the first abstract syntax tree; the matching result of the node in the first abstract syntax tree indicating whether there is a node at the same level in the second abstract syntax tree that is matched with the node in the first abstract syntax tree

S203

Determine a statement similarity between the first structured query statement and the second structured query statement based on a matching result of a root node in the first abstract syntax tree, a weight corresponding to the matching result of the root node, a matching result of a child node of the root node, and a weight corresponding to the matching result of the child node of the root node

FIG. 2

STRUCTURED QUERY STATEMENT SIMILARITY DETECTION METHOD AND APPARATUS, AND DEVICE

CROSS-REFERENCE TO RELATED APPLICATION

This application claims the priority to and benefits of the Chinese Patent Application, No. 202311628927.5, which was filed on Nov. 30, 2023. The aforementioned patent application is hereby incorporated by citation in its entirety.

TECHNICAL FIELD

The present disclosure relates to the field of computer technologies, and in particular, to a structured query statement similarity detection method and apparatus, and a device.

BACKGROUND

Structured query statement similarity detection is mainly used for detecting whether semantics expressed by a plurality of structured query statements are the same. Structured query statement similarity detection can be applied to scenarios such as query rewriting and sentence repeatability detection, or the like.

At present, the plurality of structured query statements may be directly executed to obtain a query result of each structured query statement, and a similarity between the plurality of structured query statements is determined by determining whether the plurality of query results is consistent. However, the structured query statements need to be executed with the aid of a database. In many scenarios, the database cannot be provided, or if the database can be provided, the cost of database query may be relatively high, resulting in a relatively high detection cost of this detection method.

SUMMARY

In view of the above, the present disclosure provides a structured query statement similarity detection method and apparatus and a device, which do not need to cooperate with a database to execute the structured query statements, so that the detection cost of the method is relatively low.

To solve the above problems, the technical solutions provided in the present disclosure are as follows:

According to a first aspect, the present disclosure provides a structured query statement similarity detection method, the method comprising:

acquiring a first structured query statement and a second structured query statement, and constructing a first abstract syntax tree of the first structured query statement and a second abstract syntax tree of the second structured query statement; an abstract syntax tree being used for representing an abstract syntax structure of a structured query statement, and a correlation degree between the root node in the abstract syntax tree and the query result of the structured query statement being higher than a correlation degree between other nodes and the query result of the structured query statement;

traversing a node in the first abstract syntax tree, matching the traversed node with a node at a same hierarchical level in the second abstract syntax tree, and obtaining a matching result of the node in the first abstract syntax tree; the matching result of the node in the first abstract syntax tree indicating whether there is a node at the same hierarchical level in the second abstract syntax tree that is matched with the node in the first abstract syntax tree; and determining a statement similarity between the first structured query statement and the second structured query statement based on a matching result of a root node in the first abstract syntax tree, a weight corresponding to the matching result of the root node, a matching result of a child node of the root node, and a weight corresponding to the matching result of the child node of the root node.

According to a second aspect, the present disclosure provides a structured query statement similarity detection apparatus, the apparatus comprising:

a construction unit, configured to obtain a first structured query statement and a second structured query statement, and construct a first abstract syntax tree of the first structured query statement and a second abstract syntax tree of the second structured query statement; an abstract syntax tree being used for representing an abstract syntax structure of a structured query statement, and a correlation degree between the root node in the abstract syntax tree and the query result of the structured query statement being higher than a correlation degree between other nodes and the query result of the structured query statement a traversal unit, configured to traverse a node in the first abstract syntax tree, match the traversed node with a node at a same level in the second abstract syntax tree, and obtain a matching result of the node in the first abstract syntax tree; the matching result of the node in the first abstract syntax tree indicating whether there is a node at the same level in the second abstract syntax tree that is matched with the node in the first abstract syntax tree; and a first determination unit, configured to determine a statement similarity between the first structured query statement and the second structured query statement based on a matching result of a root node in the first abstract syntax tree, a weight corresponding to the matching result of the root node, a matching result of a child node of the root node, and a weight corresponding to the matching result of the child node of the root node.

According to a third aspect, the present disclosure provides an electronic device, comprising:

one or more processors; and a storage apparatus having one or more programs stored thereon, wherein, when the one or more programs are executed by the one or more processors, the one or more processors implement the structured query statement similarity detection method according to the first aspect.

According to a fourth aspect, the present disclosure provides a computer-readable storage medium, having a computer program stored thereon, wherein, when the computer program is executed by a processor, the structured query statement similarity detection method according to the first aspect is implemented.

It can be seen that the present disclosure has the following beneficial effects:

The present disclosure provides a structured query statement similarity detection method and apparatus, and a device. A first structured query statement and a second structured query statement, for which a similarity needs to be detected, are obtained, and a first abstract syntax tree of the first structured query statement and a second abstract syntax tree of the second structured query statement are constructed. An abstract syntax tree is used for representing an abstract syntax structure of a structured query statement. A correlation degree between the root node in the abstract syntax tree and the query result of the structured query statement is higher than a correlation degree between other nodes and the query result of the structured query statement. Nodes in the first abstract syntax tree are traversed, the traversed nodes are matched with nodes at a same level in the second abstract syntax tree, and a matching result of the nodes in the first abstract syntax tree is obtained. The matching result of the nodes indicates whether there are nodes at the same level in the second abstract syntax tree that are matched with the nodes in the first abstract syntax tree. If yes, the matching result is matching, that is, a syntax structure represented by the nodes in the first structured query statement is semantically the same as a syntax structure represented by the matched nodes at the same level in the second structured query statement. Further, different weights are assigned to a matching result of a root node in the first abstract syntax tree and a matching result of a child node of the root node, and different weights indicate different influence degrees on the statement similarity. In this way, a statement similarity between the first structured query statement and the second structured query statement can be determined based on the matching result of the root node in the first abstract syntax tree, the matching result of the child node of the root node, and the weights corresponding thereto. It can be learned that in the structured query statement similarity detection method, structured query statements do not need to be executed with the aid of a database, so that a detection cost is reduced to a certain extent.

BRIEF DESCRIPTION OF DRAWINGS

FIG. 2 is a flowchart of a similarity detection method for structured query statement according to an embodiment of the present disclosure;

DETAILED DESCRIPTION

Figure 1:
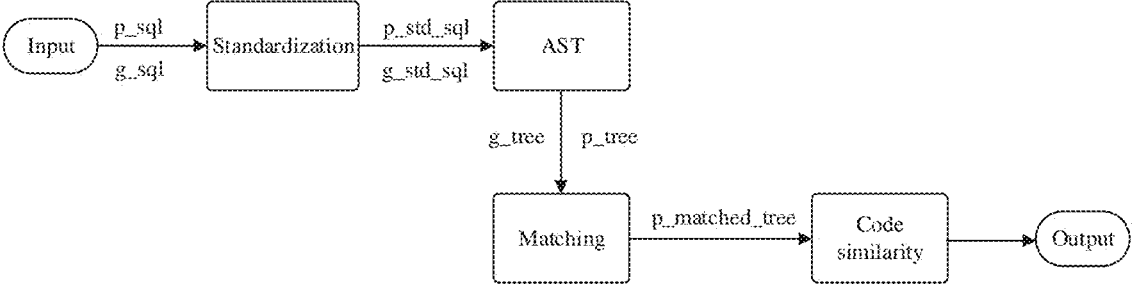
FIG. 1 is a schematic diagram of a framework of an exemplary application scenario according to an embodiment of the present disclosure.

In order to make the above objectives, features, and advantages of the present disclosure more comprehensible, the following further describes embodiments of the present disclosure in detail with reference to the accompanying drawings and specific embodiments.

In order to facilitate understanding and explaining the technical solutions provided in the embodiments of the present disclosure, the background art of the present disclosure is first described below.

Similarity detection of structured query statement is mainly used for detecting whether semantics expressed by a plurality of structured query statements (that is, SQL statements) are the same. Structured query statement similarity is used for analyzing and quantifying a semantic similarity degree between a plurality of SQL statements. The similarity of SQL statements can be applied to scenarios such as repeatability detection, query rewriting, database query performance optimization, evaluation of a code completion task, or the like.

Currently, similarity detection of SQL statements can be implemented by two matching manners: exact set matching and execution matching. In the exact set matching manner, two SQL statements (similar to a plurality of SQL statements) are first divided into a plurality of clauses, it is determined whether a text of the clauses in the two SQL statements is consistent, so as to determine the similarity of the clauses, and finally the similarities of the respective clauses are summarized to obtain a similarity between the two SQL statements. The exact set matching manner enables more accurate matching between clauses, but only considers exact matching of texts, and does not consider a situation that there may be two clauses with different texts but the same semantics. For example, texts of an SQL statement "select count(*) from table" and an SQL statement "select count(1) from table" are different, but semantics of these statements are the same.

In the execution matching manner, two SQL statements are directly executed to obtain query results. Further, the query results are compared to determine whether they are consistent, so as to determine a statement similarity between the two SQL statements. It can be learned that the query results reflect whether the semantics of the two SQL statements are the same to a certain extent. However, this manner usually involves a database query operation with a relatively high execution cost, resulting in a relatively high detection cost of the similarity of the SQL statements.

Based on this, in this embodiment of the present disclosure, a similarity detection method and apparatus and a device for structured query statement are provided. A first structured query statement and a second structured query statement, for which a similarity needs to be detected, are acquired, and a first abstract syntax tree of the first structured query statement and a second abstract syntax tree of the second structured query statement are constructed. An abstract syntax tree is used for representing an abstract syntax structure of a structured query statement. A correlation degree between the root node in the abstract syntax tree and the query result of the structured query statement is higher than a correlation degree between other nodes and the query result of the structured query statement. Nodes in the first abstract syntax tree are traversed, the traversed nodes in the first abstract syntax tree are matched with nodes at the same level in the second abstract syntax tree, and a matching result of the nodes in the first abstract syntax tree is obtained. The matching result of the nodes indicates whether there are nodes at the same level in the second abstract syntax tree that are matched with the nodes in the first abstract syntax tree. If yes, the matching result is matching, that is, a syntax structure represented by the nodes in the first structured query statement is semantically the same as a syntax structure represented by the matched nodes at the same hierarchical level in the second structured query statement. Further, different weights are assigned to the matching result of the root node in the first abstract syntax tree and the matching result of a child node of the root node, and different weights indicate different degrees of influence on the statement similarity. In this way, a statement similarity between the first structured query statement and the second structured query statement can be determined based on the matching result of the root node in the first abstract syntax tree, the matching result of the child node of the root node, and their corresponding weights. It can be learned that in the similarity detection method for structured query statement, there is no need to cooperate with the database to execute the structured query statement, so that a detection cost of the method is relatively low to a certain extent.

It may be understood that the defects in the above solutions are the results obtained by the applicant after practice and careful research. Therefore, the discovery process of the above problems and the solutions to the above problems provided in the embodiments of the present disclosure in the following should be contributions made by the applicant to the embodiments of the present disclosure.

In order to facilitate understanding of the structured query statement similarity detection method provided in the embodiments of the present disclosure, the following will be described with reference to an example of a scenario shown in FIG. 1. FIG. 1 is a schematic diagram of a framework of an exemplary application scenario according to an embodiment of the present disclosure. The method may be performed by an electronic device, for example, a terminal device and/or a server. This is not limited, and may be determined according to an actual application scenario.

As shown in FIG. 1, an input of the schematic diagram of the framework is a first structured query statement and a second structured query statement for which a similarity needs to be detected. The first structured query statement may be represented as p_sql, and the second structured query statement may be represented as g_sql. After the first structured query statement and the second structured query statement are acquired, the first structured query statement and the second structured query statement may be first standardized, so that syntax structures with different texts but the same semantics in the first structured query statement and the second structured query statement are uniformly represented after standardization, to facilitate semantic matching. The standardized first structured query statement and the standardized second structured query statement may be represented as p_std_sql and g_std_sql, respectively.

A first abstract syntax tree of the standardized first structured query statement p_std_sql and a second abstract syntax tree of the standardized second structured query statement g_std_sql are constructed. An abstract syntax tree is used for representing an abstract syntax structure of a structured query statement. A correlation degree between the root node in the abstract syntax tree and the query result of the structured query statement being higher than a correlation degree between other nodes and the query result of the structured query statement.

A node in the first abstract syntax tree p_tree is traversed, the traversed node in the first abstract syntax tree p_tree is matched with a node at a same level in the second abstract syntax tree g_tree, and a matching result of the node in the first abstract syntax tree p_tree is obtained. The matching result of the node indicates whether there is a node at the same level in the second abstract syntax tree g_tree that is matched with the node in the first abstract syntax tree p_tree. If yes, the matching result is matching; or else, the matching result is mismatch. The first abstract syntax tree marked with the matching result of the node may be represented as p_matched_tree.

Finally, a statement similarity between the first structured query statement and the second structured query statement may be determined based on the matching result of the root node in the p_matched_tree, the matching result of a child node of the root node, and their corresponding weights, and the statement similarity is output.

Persons skilled in the art may understand that the schematic diagram of the framework shown in FIG. 1 is merely an example in which an embodiment of the present disclosure may be implemented. The scope of applying the embodiments of the present disclosure is not limited by any aspect of the framework.

In order to facilitate understanding of the present disclosure, a structured query statement similarity detection method provided in an embodiment of the present disclosure is described below with reference to the accompanying drawings.

FIG. 2 is a flowchart of a structured query statement similarity detection method according to an embodiment of the present disclosure. As shown in FIG. 2, the method may include S201 to S203:

S201: Acquire a first structured query statement and a second structured query statement, and construct a first abstract syntax tree of the first structured query statement and a second abstract syntax tree of the second structured query statement; an abstract syntax tree being used for representing an abstract syntax structure of a structured query statement, and a correlation degree between the root node in the abstract syntax tree and the query result of the structured query statement is higher than a correlation degree between other nodes and the query result of the structured query statement.

The first structured query statement and the second structured query statement are structured query statements for which a similarity detection needs to be performed. Both the first structured query statement and the second structured query statement are composed of a plurality of syntax structures, and the syntax structures include a variable, a function, a keyword, a table name, a column name, a condition, an operator, a subquery, and the like. As an optional example, before the corresponding abstract syntax trees are constructed for the first structured query statement and the second structured query statement respectively, the first structured query statement and the second structured query statement may be first standardized, so that syntax structures with different texts but the same semantics in the first structured query statement and the second structured query statement are uniformly represented after standardization, which facilitates eliminating the diversity of semantic expressions and accelerating a subsequent semantic matching process.

Specifically, standardization of structured query statements may be performed through a customized standardization process, and it is not limited thereto. For example, a first structured query statement before standardization is: select*from(select product_name, price from product where type='toy' group by product_name, price;) where price>17. The standardized first structured query statement is: select product_name, price from product where type='toy' and price>17 group by product_name, price. A second structured query statement before standardization is: select t.product_name from(select product_name, price from product where type='toy' group by product_name, price;) as t; where t.price>17. The standardized second structured query statement is: select product_name from product where type='toy' and price>17 group by product_name, price. It can be learned from the foregoing examples that the standardized first structured query statement and the standardized second structured query statement are unified in syntax structure.

Further, a corresponding abstract syntax tree (AST) constructed based on the standardized first structured query statement may be referred to as a first abstract syntax tree. A corresponding abstract syntax tree constructed based on the standardized second structured query statement may be referred to as a second abstract syntax tree. An abstract syntax tree is used for representing an abstract syntax structure of a structured query statement. For example, an abstract syntax tree may be constructed by using an SQL Parser. Specifically, the SQL Parser is used to parse the first structured query statement and the second structured query statement into the first abstract syntax tree and the second abstract syntax tree.

An abstract syntax tree is a tree-shaped data structure and is composed of nodes. Each node in the tree represents one syntax structure in a structured query statement. The nodes include a root node and child nodes, and the child nodes include a clause type node and another attribute node. A syntax structure represented by the clause type node may be a keyword (such as "select", "from", "where", "group", and the like) in the structured query statement, and a syntax structure represented by the attribute node may be a table name, a column name, an operator, and the like in the structured query statement. Each node in the abstract syntax tree has a node type and a node attribute value corresponding thereto. Generally, node attribute values of the root node and the clause type node are empty. An abstract syntax tree is divided into a plurality of levels from top to bottom starting from the root node, and the abstract syntax tree is formed through hierarchical relationships between the plurality of nodes.

Figures 3, 4A:
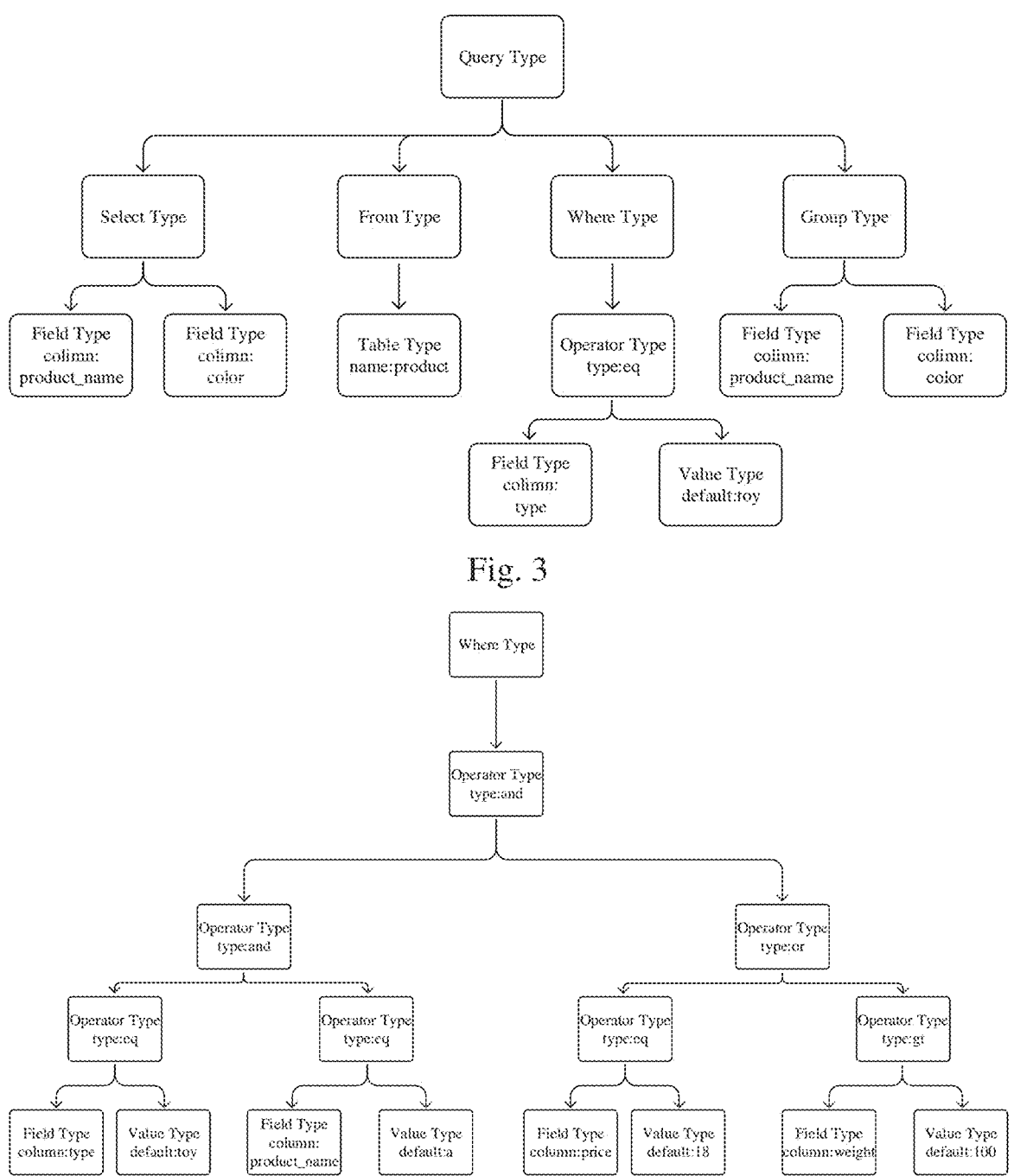
FIG. 3 is a schematic diagram of an abstract syntax tree according to an embodiment of the present disclosure.
FIG. 4a is a schematic diagram of a first abstract syntax tree according to an embodiment of the present disclosure.

FIG. 3 is a schematic diagram of an abstract syntax tree according to an embodiment of the present disclosure. A standardized structured query statement is: select product_name, color from product where type='toy' group by product_name, color. The abstract syntax tree constructed based on the structured query statement is shown in FIG. 3, and includes four levels, which may be a first level to a fourth level from top to bottom. A root node at the first level is a Query Type, and the query type is a root type, representing a query operation of the structured query statement. Nodes at the next level below the root node are four clause type nodes, node types of the nodes are Select Type, From Type, Where Type, and Group Type respectively, representing keywords "select", "from", "where", and "group" in the structured query statement. Nodes at the next level below the clause type node includes six attribute nodes. For example, a node type of a first attribute node is a Field Type, representing a column name in the structured query statement, and a node attribute value is column:product_name, that is, the column name is product_name. A node type of a third attribute node is a Table Type, representing a table name in the structured query statement, and a node attribute value is name: product, that is, the table name is product. The product_name is a column name of a column in a product data table. A node type of a fourth attribute node is an Operator Type, representing an operator in the structured query statement, and a node attribute value is type:eq, that is, the operator is specifically "equal to". The fourth level includes two attribute nodes, which are not described herein again.

Generally, a syntax structure represented by a node at a level far away from the root node is first executed in the structured query statement, and a syntax structure represented by a node at a level close to the root node is executed later in the structured query statement. A syntax structure represented by a leaf node in the abstract syntax tree is first executed in the structured query statement. As shown in FIG. 3, the root node is the query type, representing the query operation of the entire structured query statement, and a query result of the structured query statement can be obtained after the query operation, and a correlation degree between the root node of the query type and the query result of the structured query statement is higher than a correlation degree between other nodes and the query result of the structured query statement. For example, a structured query statement is "1+1", a root node in an abstract syntax tree generated by the structured query statement is an "add" operation, and two child nodes are both "1". Since the query result of the structured query statement can be obtained after the add operation is executed by the structured query statement, a correlation degree between the root node "add" and the query result of the structured query statement is higher than a correlation degree between the child nodes "1" and the query result of the structured query statement.

It may be understood that after a corresponding abstract syntax tree is constructed based on the structured query statement, the abstract syntax tree can represent an abstract syntax structure of the structured query statement, and therefore a keyword, a table name, a column name, a condition, an operator, and the like in the structured query statement can be learned more accurately according to the abstract syntax tree. Therefore, detecting the statement similarity between the first structured query statement and the second structured query statement is converted into detecting a similarity between the first abstract syntax tree and the second abstract syntax tree.

S202: Traverse a node in the first abstract syntax tree, match the traversed node with a node at a same level in the second abstract syntax tree, and obtain a matching result of the node in the first abstract syntax tree; the matching result of the node in the first abstract syntax tree indicating whether there is a node at the same level in the second abstract syntax tree that is matched with the node in the first abstract syntax tree.

For example, a similarity between the first abstract syntax tree and the second abstract syntax tree may be determined based on matching results of nodes in the first abstract syntax tree and the second abstract syntax tree. Specifically, a node in the first abstract syntax tree is traversed, and since nodes at the same level in different trees are more likely to be successfully matched, the traversed node in the first abstract syntax tree is matched with a node at the same level in the second abstract syntax tree, and thus a matching result of the node in the first abstract syntax tree is obtained. There may be one or more nodes at the same level in the second abstract syntax tree.

The matching result of the node indicates whether there is a node at the same hierarchical level in the second abstract syntax tree that is matched with the node in the first abstract syntax tree. Further, a value of 1 may be assigned to a successfully matched node in the first abstract syntax tree, and a value of 0 may be assigned to an unsuccessfully matched node in the first abstract syntax tree, to distinguish the matching results of the nodes. Generally, a greater number of nodes that can be matched indicates a higher similarity between the first abstract syntax tree and the second abstract syntax tree, and further indicates a higher statement similarity between the first structured query statement and the second structured query statement.

In a possible embodiment, this embodiment of the present disclosure provides a specific implementation of traversing a node in the first abstract syntax tree, matching the traversed node with a node at a same level in the second abstract syntax tree, and obtaining a matching result of the node in the first abstract syntax tree, including:

A1: Traverse the node in the first abstract syntax tree hierarchically according to a bottom-up hierarchical structure of the first abstract syntax tree.

Because a syntax structure represented by a node at a level far away from the root node is first executed in the structured query statement, and a syntax structure represented by a node at a level near the root node is executed later in the structured query statement, leaf nodes of the first abstract syntax tree are first traversed, then the nodes are traversed according to the hierarchical structure from bottom to top, and finally the root node of the first abstract syntax tree is traversed, according to an execution sequence.

A2: Determine a first node that is traversed in the first abstract syntax tree and a second node that is at a same level as the first node in the second abstract syntax tree.

A node that is traversed each time in the first abstract syntax tree is referred to as the first node, and a node that is at the same level as the first node in the second abstract syntax tree is referred to as the second node. There may be one or more second nodes.

A3: Determine whether a node type of the first node is the same as a node type of the second node and whether a node attribute value of the first node and a node attribute value of the second node satisfy an attribute value matching rule, and obtain the matching result of the first node according to a determination result.

Each node in the abstract syntax tree has a node type and a node attribute value corresponding thereto, and a matching result of the node may be determined through matching of the node type and the node attribute value. Specifically, when the node type of the first node is the same as a node type of the second node and the node attribute value of the first node and a node attribute value of the second node satisfy an attribute value matching rule, it is determined that the matching result of the first node is matching, that is, the first node is matched with the second node. Otherwise, it is determined that the matching result of the first node is mismatch, that is, the first node is not matched with the second node.

As an optional example, the attribute value matching rule is that a node attribute value of the first node is the same as a node attribute value of the second node, or the node attribute value of the first node is semantically the same as the node attribute value of the second node. It may be understood that different syntax structures may have different texts but the same semantics, and thus such syntax structures are similar in semantics, and it may be considered that the nodes corresponding to such syntax structures are matched. A rule of determining whether the node attribute value of the first node is semantically the same as the node attribute value of the second node may be implemented through customization, which is not limited thereto, and may be flexibly extended. For example, various node attribute values with the same semantics may be included in a customized rule. For example, semantics of "BJ" and "beijing" are the same.

It may be understood that when a node attribute value of a node is empty, it can only be determined whether the node type of the first node is the same as the node type of the second node.

A4: When there is a plurality of second nodes, compare a plurality of matching results of the first node and re-determine the matching result of the first node.

It may be understood that when there is the plurality of second nodes, the first node needs to be matched with each second node at the same level, and the plurality of matching results of the first node are obtained. Further, the matching results may be quantified, and the quantification method is not limited here, for example, score quantification. In this way, the plurality of matching results of the first nodes are compared, and a matching result with a highest matching degree (that is, a highest score) is selected and re-used as a final matching result of the first node.

It can be learned from A1 to A4 that whether the first node is matched with the second node may be determined based on the node type of the node, the node attribute value of the node, and the like. If the first node is matched with the second node, it indicates that the node type of the first node is the same as the node type of the second node, and the node attribute value of the first node is semantically the same as the node attribute value of the second node.

In addition, in a possible implementation, after A3 and before A4, the method further comprises:

B1: Determine a first child node at a level adjacent to the first node, and a second child node at a level adjacent to the second node; the second child node being at a same level as the first child node.

B2: Determine whether a node type of the first child node is the same as a node type of the second child node and whether a node attribute value of the first child node and a node attribute value of the second child node satisfy an attribute value matching rule, and obtain the matching result of the first child node according to a determination result.

Since technical implementations of steps B1 and B2 are similar to those of steps A2 and A3, they are not described herein again.

B3: Re-determine the matching result of the first node based on the matching result of the first node, a weight corresponding to the matching result of the first node, the matching result of the first child node, and a weight corresponding to the matching result of the child node of the first node.

A sum of the weight corresponding to the matching result of the first node and the weight corresponding to the matching result of the child node of the first node is 1.

That is, when determining the matching result of the first node, not only the matching result of the first node but also the matching result of a child node at the level adjacent to the first node is considered, so that the re-determined matching result of the first node is more accurate. When the weight corresponding to the matching result of the first node is higher than the weight corresponding to the matching result of the child node of the first node, it indicates that the matching result of the first node is more important.

In a possible implementation, this embodiment of the present disclosure provides a specific implementation of re-determining the matching result of the first node based on the matching result of the first node, the weight corresponding to the matching result of the first node, the matching result of the first child node, and the weight corresponding to the matching result of the child node of the first node, including:

B31: Determine a score of the first node based on the matching result of the first node.

The first node in the first abstract syntax tree may be represented as n, and each second node at the same level as the first node in the second abstract syntax tree may be represented as $n_j$. i∈{0, 1, . . . , 1}, where 1 represents a number of the second nodes at the same level as the first node. The matching result of the first node is obtained through matching between the first node n and the second node $n_i$ at the same level as the first node, and a corresponding score of the first node may be represented as $$m^i_{self} \cdot m^i_{self}$$

is specifically:

$$m^i_{self} = \begin{cases} 1, & \text{type}(n) == \text{type}(n_i) \ \&(val(n) == val(n_i) \vee \text{custom\_fn}(n, n_i) \\ 0, & \text{otherwise} \end{cases}.$$

type(n)==type($n_i$) indicates that the node type of the first node is the same as the node type of the second node, (val(n)==val($n_i$)\/custom_fn(n,$n_i$) indicates that the node attribute value of the first node and the node attribute value of the second node satisfy the attribute value matching rule. val(n)==val($n_i$) indicates that the node attribute value of the first node is the same as the node attribute value of the second node, and custom_fn (n,$n_i$) indicates that the node attribute value of the first node is semantically the same as the node attribute value of the second node. Therefore, when the node type of the first node is the same as the node type of the second node and the node attribute value of the first node and the node attribute value of the second node satisfy the attribute value matching rule, it is determined that the matching result of the first node is matching. In this case, the score of the first node is 1; or else, the score is 0. It may be understood that a specific score of the first node is not limited here and may be another score.

B32: Determine a score of the first child node based on the matching result of the first child node.

The score of the first child node may be represented as $$m^i_{children},$$

and is used for quantifying a matching result between the first child node and the second child node.

In an actual application, when the first child node has no child node at next adjacent level, a process of determining the score of the first child node is the same as a process of obtaining $$m^i_{self}$$

in B31. When the first child node has the child node at next adjacent level, the score of the first child node is determined based on the matching result of the first child node and the matching result of the child node at next adjacent level of the first child node. That is, it is the same as a process of obtaining $m^i$ in B34. When the score of the first child node is determined, the weight corresponding to the matching result of the first child node and the weight corresponding to the matching result of the child node of the first child node may also be α and (1−α) in the following description, and this is not limited thereto. The weight corresponding to the matching result of the child node of the first child node is used for representing an influence degree of the matching result of the child node at next adjacent level of the first child node on the score of the first child node.

B33: When there is a plurality of first child nodes, determine an average value of scores of the plurality of first child nodes as a score of the child node of the first node.

B34: Perform weighted summation on the score of the first node, the weight corresponding to the matching result of the first node, the score of the child node of the first node, and the weight corresponding to the matching result of the child node of the first node, to re-obtain the score of the first node.

The re-obtained score of the first node may be represented as $m^i$, and is used for quantifying a matching result between the first child node n and the second node $n_i$ at the same level as the first child node. The re-obtained score $m^i$ of the first node may be represented as:

$$m^i = \alpha m^i_{self} + (1 - \alpha) m^i_{children}, \alpha \in (0,1)$$

where α is an adjustment factor, and may also be referred to as the weight corresponding to the matching result of the first node. (1−α) is the weight corresponding to the matching result of the child node of the first node.

B35: Determine the matching result of the first node based on the score of the first node.

For example, when the score of the first node is greater than a score threshold, it is determined that the matching result of the first node is matching; or else, it is determined that the matching result of the first node is mismatch. The matching threshold is not limited here and may be determined based on an actual situation. For example, when a full score is 1, the score threshold may be 0.5.

In addition, when there is a plurality of matching results of the first node, a plurality of scores of first node may be obtained, and a highest score m is determined through comparing the plurality of the scores of first node, that is, m=max($m^i$). The highest score indicates a highest matching degree after the matching results are quantified. The second node with the highest matching degree may be considered as a node that is finally matched with the first node in the second abstract syntax tree.

Figures 4B, 4C:
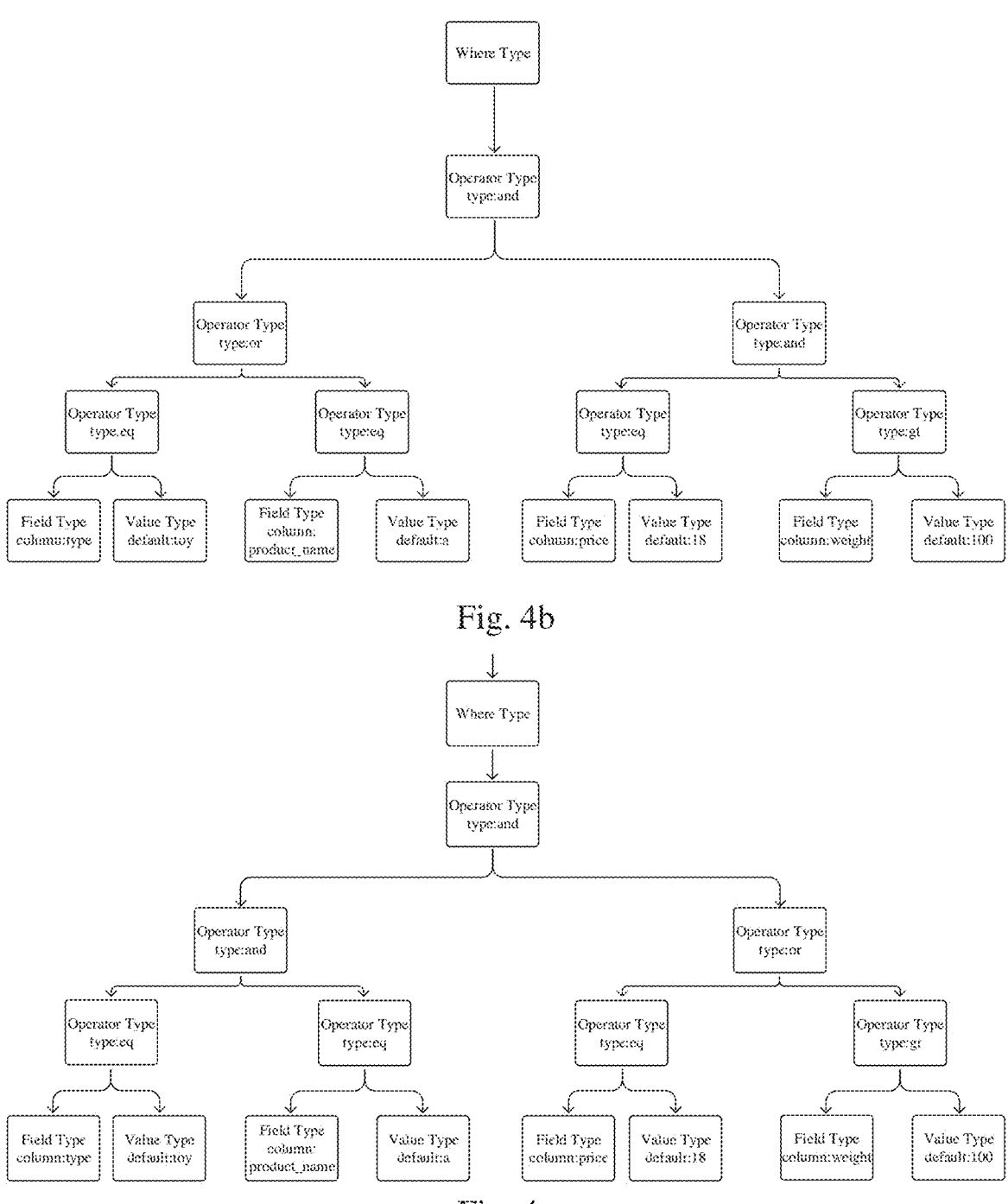
FIG. 4b is a schematic diagram of a second abstract syntax tree according to an embodiment of the present disclosure.
FIG. 4c is a schematic diagram of a matching result according to an embodiment of the present disclosure.
Figures 4D, 5A:
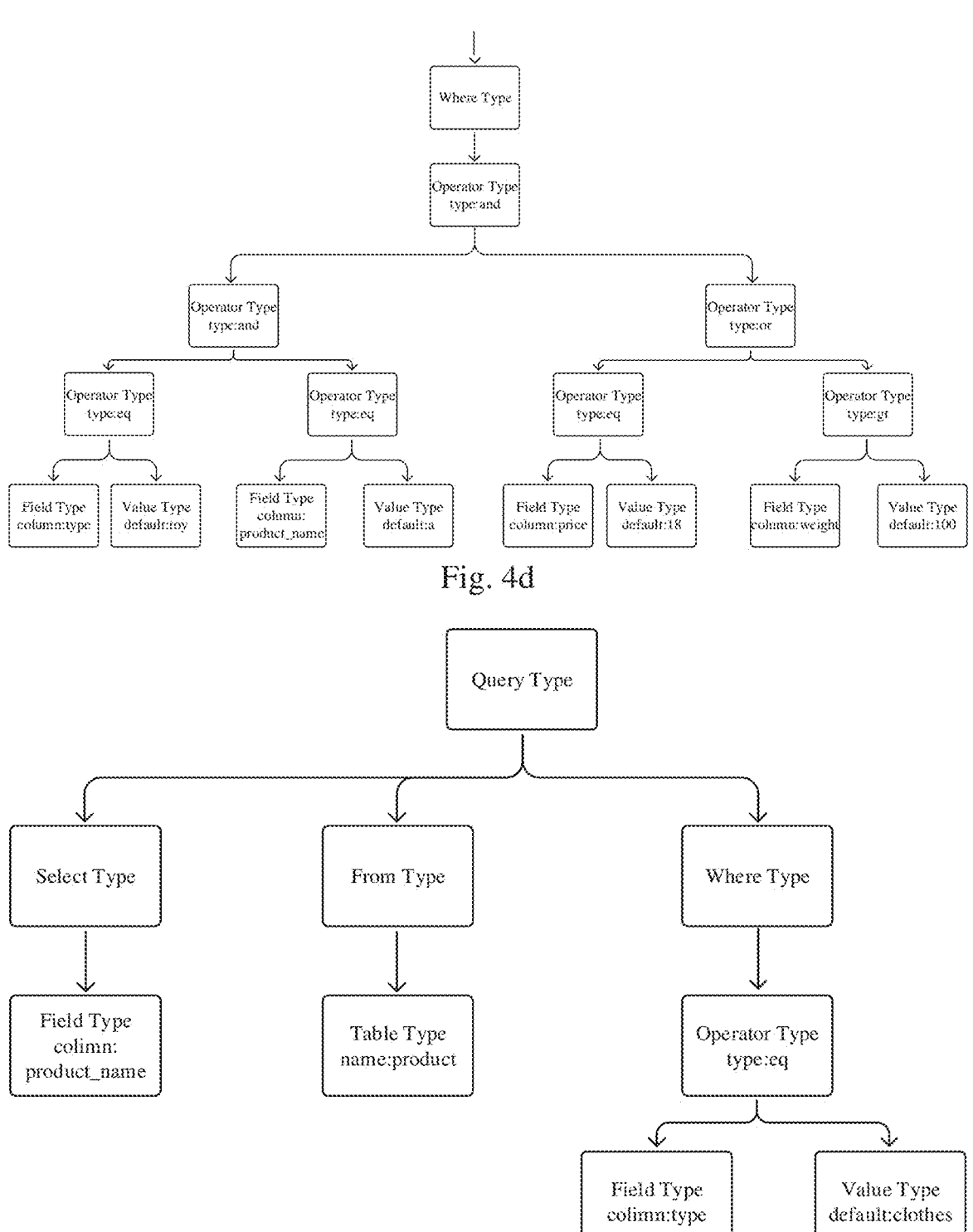
FIG. 4d is a schematic diagram of another matching result according to an embodiment of the present disclosure.
FIG. 5a is a schematic diagram of another second abstract syntax tree according to an embodiment of the present disclosure.

Referring to FIG. 4a and FIG. 4b, FIG. 4a is a schematic diagram of a first abstract syntax tree according to an embodiment of the present disclosure, and FIG. 4b is a schematic diagram of a second abstract syntax tree according to an embodiment of the present disclosure. A standardized first structured query statement represented by the first abstract syntax tree in FIG. 4a is: where (product_name='a' and type=='toy') and (price>18 or weight>100), and a standardized first structured query statement represented by the second abstract syntax tree in FIG. 4b is: where (product_name='a' or type=='toy') and (price>18 and weight>100). Referring to FIG. 4c and FIG. 4d, FIG. 4c is a schematic diagram of a matching result according to an embodiment of the present disclosure, and FIG. 4d is a schematic diagram of another matching result according to an embodiment of the present disclosure. FIG. 4c shows a matching result of a node of the first abstract syntax tree when α is less than 0.5, and FIG. 4d shows a matching result of a node of the first abstract syntax tree when α is greater than 0.5. As shown in FIG. 4c and FIG. 4d, when α is less than 0.5 or α is greater than 0.5, the matching results of the node are different. In FIG. 4c and FIG. 4d, when a node has a dark background color, it indicates that a matching result of the node is mismatch (that is, there is no node at a same level in the second abstract syntax tree that is matched with the node), and when a node has a light background color, it indicates that a matching result of the node is matching (that is, there is a node at a same level in the second abstract syntax tree that is matched with the node). In this way, a proper adjustment factor may be selected based on an actual requirement. For example, if an influence of the matching result of the first node on the score of the first node is to be emphasized, a corresponding adjustment factor may be increased.

It can be learned from B1 to B3 that the matching result of the first node may be determined based on the matching result of the first node and the matching result of the child node at the adjacent level of the first node, so that the matching result of the first node is more accurate.

It can be learned from B31 to B35 that the matching result of the first node and the matching result of the child node at the adjacent level of the first node may be quantified by scores, and the matching result of the first node is determined based on the score of the first node, so that the matching result of the first node can be represented more intuitively.

S203: Determine a statement similarity between the first structured query statement and the second structured query statement based on a matching result of a root node in the first abstract syntax tree, a weight corresponding to the matching result of the root node, a matching result of a child node of the root node, and a weight corresponding to the matching result of the child node of the root node.

The weight corresponding to the matching result of the root node is different from the weight corresponding to the matching result of the child node of the root node, indicating that influence degrees of the matching result of the root node and the matching result of the child node of the root node in the first abstract syntax tree on the statement similarity are different. The weights corresponding thereto may be determined based on an actual situation.

A sum of the weight corresponding to the matching result of the root node and the weight corresponding to the matching result of the child node of the root node is 1. The weights are different, indicating that different influence degrees on the statement similarity between the first structured query statement and the second structured query statement.

In a possible implementation, this embodiment of the present disclosure provides a specific implementation of determining a statement similarity between the first structured query statement and the second structured query statement based on a matching result of a root node in the first abstract syntax tree, a weight corresponding to the matching result of the root node, a matching result of a child node of the root node, and a weight corresponding to the matching result of the child node of the root node, including:

C1: Determine a score of the root node in the first abstract syntax tree based on the matching result of the root node in the first abstract syntax tree.

After a matching result (matching or mismatch) of each node in the first abstract syntax tree is determined, the matching result of the node in the first abstract syntax tree may be quantified by using a score.

For example, a score of the node may be represented as $$s_{self}^j.$$

When the matching result is matching, it may be determined that the score of the node is 1; or else, the score is 0. It may be learned that a specific score is not limited here, and is described as an example only.

C2: Determine a score of a child node at an adjacent level of the root node based on the matching result of the child node at the adjacent level of the root node, and determine an average value of scores of a plurality of child nodes at the adjacent level as a score of the child node of the root node.

The score of the child node of the node is represented as $$s_{children}^i, s_{children} = \sum_{j=1}^{M} s_j/M. \ j$$

is each child node at the adjacent level of the node, M is a number of child nodes at the adjacent level of the node, and $s_j$ is the score of each child node at the adjacent level of the node.

C3: Perform weighted summation on the score of the root node, the weight corresponding to the matching result of the root node, the score of the child node of the root node, and the weight corresponding to the matching result of the child node of the root node, to re-obtain the score of the root node.

The re-obtained score S of the node may be represented as $$s = \beta s_{self}^i + (1 - \beta)s_{children}^i. \ \beta$$

represents the weight corresponding to the matching result of the node, and (1−β) represents the weight corresponding to the matching result of the child node of the node. When a node attribute value corresponding to the node is empty, the weight corresponding to the matching result of the node is 0.

It can be learned that when the node is the root node, the above formulas in C1 to C3 can be applied. In actual application, a score of a leaf node may be first calculated, then a score of each node in each level is calculated from bottom to top, and finally a score of the root node may be obtained.

C4: Determine the statement similarity between the first structured query statement and the second structured query statement based on the score of the root node.

Because a correlation degree between the root node and a query result of the structured query statement is higher than a correlation degree between other nodes and the query result of the structured query statement, to adapt to an execution sequence of a node in an abstract syntax tree in the code, the statement similarity between the first structured query statement and the second structured query statement is determined based on the score of the root node. When the score of the root node is higher, it is determined that the statement similarity between the first structured query statement and the second structured query statement is higher.

Figures 5B, 6:
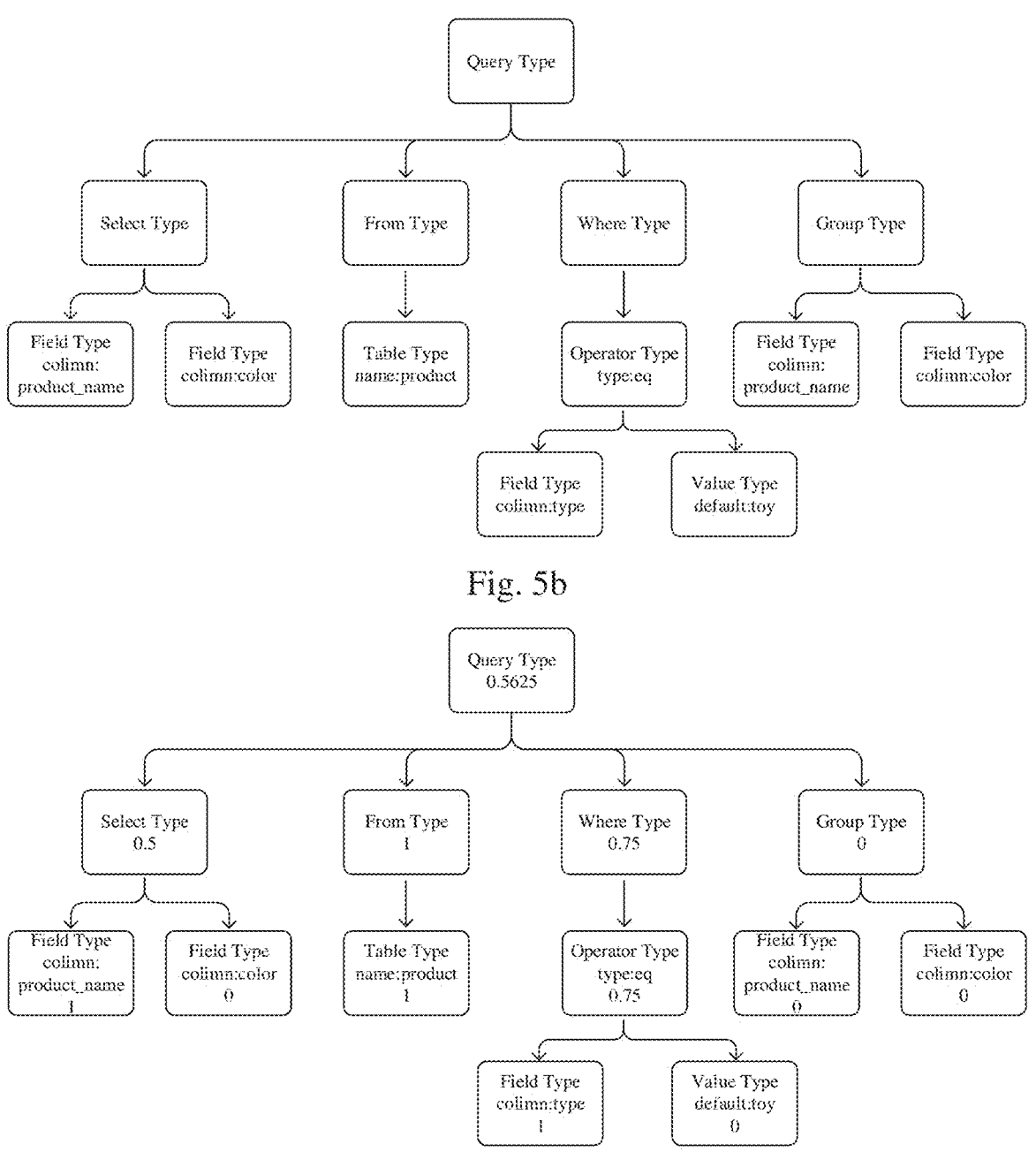
FIG. 5b is a schematic diagram of another matching result according to an embodiment of the present disclosure.
FIG. 6 is a schematic diagram of a score of a root node according to an embodiment of the present disclosure.

Referring to FIG. 5a and FIG. 5b, FIG. 5a is a schematic diagram of another second abstract syntax tree according to an embodiment of the present disclosure, and FIG. 5b is a schematic diagram of another matching result according to an embodiment of the present disclosure. Taking "select product_name, color from product where type=='toy' group by product_name, color" as the first structured query statement as an example, an obtained first abstract syntax tree is shown in FIG. 3. The second structured query statement is "select product_name from product where type=='clothes'", and an obtained second abstract syntax tree is shown in FIG. 5a. A matching result of each node in the first abstract syntax tree obtained after executing step S202 is shown in FIG. 5b. When a node has a dark background color, it indicates that the matching result of the node is mismatch; or else, it indicates that the matching result of the node is match. FIG. 6 is a schematic diagram of a score of a root node according to an embodiment of the present disclosure. As shown in FIG. 6, because a leaf node has no child node, a score of the leaf node is $s_{self}^{i}$. Taking an Operator Type node at a third level as an example, it has two child nodes, and $\beta$ is set to 0.5, and therefore a score of the node is $0.5 \times 1 + 0.5 \times ((1+0)/2)=0.75$. Because a node attribute value of a Where Type node at a second level is empty, a weight corresponding to a matching result of the node is 0, and a weight corresponding to a matching result of a child node of the node is $$s_{self}^{i}.$$

therefore, a score of the node is $1 \times 0.75=0.75$. That is, when a node attribute value of a node is empty and a number of child nodes is 1, a score of the node is equal to a score of the child node of the node. A score of the root node is 0.5625, and the statement similarity between the first structured query statement and the second structured query statement may be evaluated based on this.

It can be learned from the related content of S201 to S203 that a first structured query statement and a second structured query statement for which a similarity needs to be detected are acquired, and a first abstract syntax tree of the first structured query statement and a second abstract syntax tree of the second structured query statement are constructed. An abstract syntax tree is used for representing an abstract syntax structure of a structured query statement, where a correlation degree between the root node in the abstract syntax tree and the query result of the structured query statement is higher than a correlation degree between other nodes and the query result of the structured query statement. Through traversing the abstract syntax tree, operations such as syntax analysis, semantic analysis, and execution may be performed. A node in the first abstract syntax tree is traversed, the traversed node in the first abstract syntax tree is matched with a node at a same level in the second abstract syntax tree, and a matching result of the node in the first abstract syntax tree is obtained. The matching result of the node indicates whether there is a node at the same level in the second abstract syntax tree that is matched with the node in the first abstract syntax tree. If yes, the matching result is matching, that is, a syntax structure represented by a node in the first structured query statement is semantically the same as a syntax structure represented by a matched node at the same level in the second structured query statement. Further, different weights are allocated to a matching result of a root node and a matching result of a child node of the root node in the first abstract syntax tree. The different weights indicate different influence degrees on a statement similarity. Therefore, a statement similarity between the first structured query statement and the second structured query statement may be determined based on the matching result of the root node in the first abstract syntax tree, the weight corresponding to the matching result of the root node, the matching result of the child node of the root node, and the weight corresponding to the matching result of the child node of the root node. It can be learned that in this method, a database does not need to be executed, and thus the detection cost is low, and semantic similarity matching is ensured. In addition, matching of a part of nodes may also be performed. For a code that is not completely correct, a part of scores may also be obtained, and the matching of the part of nodes is quantified through the part of scores.

In a possible implementation, this embodiment of the present disclosure provides a specific implementation of determining a statement similarity between the first structured query statement and the second structured query statement based on a matching result of a root node in the first abstract syntax tree, a weight corresponding to the matching result of the root node, a matching result of a child node of the root node, and a weight corresponding to the matching result of the child node of the root node in S203, including:

D1: Determine a first similarity between the first structured query statement and the second structured query statement based on the matching result of the root node in the first abstract syntax tree, the weight corresponding to the matching result of the root node, the matching result of the child node of the root node, and the weight corresponding to the matching result of the child node of the root node.

That is, the statement similarity determined in S203 may be referred to as the first similarity between the first structured query statement and the second structured query statement.

D2: Traverse a node in the second abstract syntax tree, match the traversed node with a node at a same level in the first abstract syntax tree, and obtain a matching result of the node in the second abstract syntax tree; the matching result of the node in the second abstract syntax tree indicating whether there is a node at the same level in the first abstract syntax tree that is matched with the node in the second abstract syntax tree.

D3: Determine a second similarity between the first structured query statement and the second structured query statement based on a matching result of a root node in the second abstract syntax tree, a weight corresponding to the matching result of the root node, a matching result of a child node of the root node, and a weight corresponding to the matching result of the child node of the root node.

It may be understood that if the first abstract syntax tree is a subtree of the second abstract syntax tree, nodes in the first abstract syntax tree can be all matched with nodes in the second abstract syntax tree, but the first abstract syntax tree and the second abstract syntax tree are not the same. To avoid occurrence of this situation and make a statement similarity between the first structured query statement and the second structured query statement more accurate, a reference may be made to the second abstract syntax tree, and the second similarity between the first structured query statement and the second structured query statement is obtained by performing D2 to D3. Technical implementations of D2 to D3 are similar to those of S202 to S203, and are not described herein again.

The first similarity may be considered as a degree to which the second abstract syntax tree is matched with the first abstract syntax tree, and the second similarity may be considered as a degree to which the first abstract syntax tree is matched with the second abstract syntax tree.

D4: Determine the statement similarity between the first structured query statement and the second structured query statement based on the first similarity and the second similarity.

The determining the statement similarity between the first structured query statement and the second structured query statement based on the first similarity and the second similarity includes D41 or D42:

D41: Use an average result of the first similarity and the second similarity as the statement similarity between the first structured query statement and the second structured query statement.

In an optional example, an average similarity between the first similarity and the second similarity may be directly obtained, and the average similarity is used as the statement similarity between the first structured query statement and the second structured query statement.

For example, when both the first similarity and the second similarity are represented by scores, an average score of the two scores may be obtained, and the average score is used to evaluate the statement similarity between the first structured query statement and the second structured query statement.

D42: Use the first similarity as a precision, use the second similarity as a recall, calculate an $F_{\beta1}$ score, and determine the statement similarity between the first structured query statement and the second structured query statement based on the $F_{\beta1}$ score.

In another optional example, the first similarity is used as the precision, the second similarity is used as the recall, the $F_{\beta1}$ score is calculated through an $F_{\beta1}$ score formula, and the statement similarity between the first structured query statement and the second structured query statement is determined based on the $F_{\beta1}$ score. When the $F_{\beta1}$ score is higher, the statement similarity between the first structured query statement and the second structured query statement is higher.

The $F_{\beta1}$ score formula is as follows:

$$F_{\beta1} = \frac{(1 + \beta1^2)\text{PRECISION} \times \text{RECALL}}{\beta1^2 \times \text{PRECISION} + \text{RECALL}}$$

Where $\beta1$ is an adjustment factor, PRECISION represents the precision, and RECALL represents the recall. It may be understood that $\beta1$ may be adjusted based on an actual requirement.

In actual application, the detection method for a similarity of structured query statements based on an abstract syntax tree according to this embodiment of the present disclosure can facilitate database application program development and database management, improve detection efficiency of a similarity between different structured query statements, and provide timely feedback for developers to help improve SQL statements in a program. In addition, the method may be applied to hyperparameter tuning of a large language model, such as fine-tuning of Prompts, temperature, and Prefix, to improve the performance of the large model on a traditional NL2SQL task. For example, when the large model has a function for developing SQL statements, the structured query statement similarity detection method according to this embodiment of the present disclosure may be used to detect a quality of developed SQL statements. When a similarity between the SQL statements is high, it indicates that a development quality of the SQL is low. In this case, a parameter of the large model may be adjusted to improve the development quality of the SQL statements. That is, the parameter of the large model is tuned based on the development quality of the SQL statements. In addition, the SQL statement similarity detection method based on an abstract syntax tree according to this embodiment of the present disclosure may also be applied to a model prediction problem, where a model outputs a predicted SQL statement, and a prediction effect of the model is detected based on a similarity between the predicted SQL statement and a standard SQL statement. In this application, when the $F_{\beta1}$ score is used to evaluate the similarity between the predicted SQL statement and the standard SQL statement, and the predicted SQL statement corresponds to the first structured query statement and the standard SQL statement corresponds to the second structured query statement, if whether a semantic structure of the standard SQL statement is matched with the predicted SQL statement is more emphasized, the second similarity, that is, the recall, is relatively more emphasized. In this case, $\beta1$ may be adjusted to be larger.

Persons skilled in the art may understand that in the above method of the specific implementations, an order of the steps does not mean a strict execution order, and does not constitute any limitation on an implementation process. A specific execution order of the steps shall be determined by functions and a possible internal logic thereof.

Based on the structured query statement similarity detection method provided in the foregoing method embodiment, this embodiment of the present disclosure further provides a structured query statement similarity detection apparatus. The following describes the structured query statement similarity detection method with reference to the accompanying drawings. Because a principle of solving a problem by the apparatus in the embodiments of the present disclosure is similar to that of the above structured query statement similarity detection method in the embodiments of the present disclosure, implementation of the apparatus may refer to implementation of the method, and details of the same parts are not described again.

Figure 7:
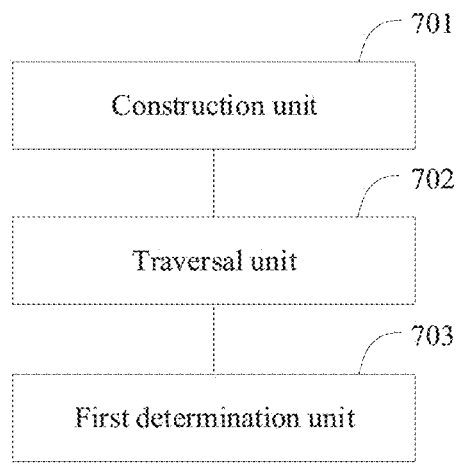
FIG. 7 is a schematic diagram of a structure of a similarity detection apparatus for structured query statement according to an embodiment of the present disclosure.

FIG. 7 is a schematic diagram of a structure of a structured query statement similarity detection apparatus according to an embodiment of the present disclosure. As shown in FIG. 7, the structured query statement similarity detection apparatus includes:

a construction unit 701, configured to acquire a first structured query statement and a second structured query statement, and construct a first abstract syntax tree of the first structured query statement and a second abstract syntax tree of the second structured query statement, where an abstract syntax tree is used for representing an abstract syntax structure of a structured query statement, a correlation degree between a root node in the abstract syntax tree and a query result of the structured query statement is higher than a correlation degree between other nodes and the query result of the structured query statement;

a traversal unit 702, configured to traverse a node in the first abstract syntax tree, match the traversed node with a node at a same level as the traversed node in the second abstract syntax tree, and obtain a matching result of the node in the first abstract syntax tree, where the matching result of the node in the first abstract syntax tree indicates whether there is a node at the same level in the second abstract syntax tree that is matched with the node in the first abstract syntax tree; and a first determination unit 703, configured to determine a statement similarity between the first structured query statement and the second structured query statement based on a matching result of a root node in the first abstract syntax tree, a weight corresponding to the matching result of the root node, a matching result of a child node of the root node, and a weight corresponding to the matching result of the child node of the root node.

In a possible implementation, the traversal unit 702 includes:

a first traversal subunit, configured to hierarchically traverse the node in the first abstract syntax tree according to a bottom-up hierarchical structure of the first abstract syntax tree;

a first determination subunit, configured to determine a first node that is traversed in the first abstract syntax tree and a second node that is at a same level as the first node in the second abstract syntax tree;

a determining subunit, configured to determine whether a node type of the first node is the same as a node type of the second node and whether a node attribute value of the first node and a node attribute value of the second node satisfy an attribute value matching rule, and obtain the matching result of the first node according to a determination result; and a second determination subunit, configured to compare a plurality of matching results of first nodes when there is a plurality of second nodes, and re-determine the matching result of the first node.

In a possible implementation, the apparatus further includes:

a second determination unit, configured to, after the matching result of the first node is obtained according to the determination result and before the comparing a plurality of matching results of first nodes when there is a plurality of second nodes, and re-determining the matching result of the first node, determine a first child node at a level adjacent to the first node, and a second child node at a level adjacent to the second node, where the second child node is at a same level as the first child node;

a determining unit, configured to determine whether a node type of the first child node is the same as a node type of the second child node and whether a node attribute value of the first child node and a node attribute value of the second child node satisfy an attribute value matching rule, and obtain the matching result of the first child node according to a determination result; and a third determination unit, configured to re-determine the matching result of the first node based on the matching result of the first node, a weight corresponding to the matching result of the first node, the matching result of the first child node, and a weight corresponding to the matching result of the child node of the first node.

In a possible implementation, the third determination unit includes:

a third determination subunit, configured to determine a score of the first node based on the matching result of the first node;

a fourth determination subunit, configured to determine a score of the first child node based on the matching result of the first child node;

a fifth determination subunit, configured to, when there is a plurality of first child nodes, determine an average value of scores of the plurality of first child nodes as a score of the child node of the first node;

a first obtaining subunit, configured to perform weighted summation on the score of the first node, the weight corresponding to the matching result of the first node, the score of the child node of the first node, and the weight corresponding to the matching result of the child node of the first node, to re-obtain the score of the first node; and a sixth determination subunit, configured to determine the matching result of the first node based on the score of the first node.

In a possible implementation, the attribute value matching rule is that a node attribute value of the first node is the same as a node attribute value of the second node or the node attribute value of the first node is semantically the same as the node attribute value of the second node.

In a possible implementation, each node in the abstract syntax tree has a node type and a node attribute value corresponding thereto;

the first determination unit 703 includes:

a seventh determination subunit, configured to determine a score of the root node in the first abstract syntax tree based on the matching result of the root node in the first abstract syntax tree;

an eighth determination subunit, configured to determine a score of a child node at an adjacent level of the root node based on the matching result of the child node at the adjacent level of the root node, and determine an average value of scores of a plurality of child nodes at the adjacent level as a score of the child node of the root node;

a second obtaining subunit, configured to perform weighted summation on the score of the root node, the weight corresponding to the matching result of the root node, the score of the child node of the root node, and the weight corresponding to the matching result of the child node of the root node, to re-obtain the score of the root node; and a ninth determination subunit, configured to determine the statement similarity between the first structured query statement and the second structured query statement based on the score of the root node;

where when a node attribute value corresponding to the root node is empty, a weight corresponding to the matching result of the root node is 0, and a weight corresponding to the matching result of the child node of the root node is 1.

In a possible implementation, the first determination unit 703 includes:

a tenth determination subunit, configured to determine a first similarity between the first structured query statement and the second structured query statement based on the matching result of the root node in the first abstract syntax tree, the weight corresponding to the matching result of the root node, the matching result of the child node of the root node, and the weight corresponding to the matching result of the child node of the root node;

a second traversal subunit, configured to traverse a node in the second abstract syntax tree, match the traversed node with a node at a same level in the first abstract syntax tree, and obtain a matching result of the node in the second abstract syntax tree; the matching result of the node in the second abstract syntax tree indicating whether there is a node at the same level in the first abstract syntax tree that is matched with the node in the second abstract syntax tree;

an eleventh determination subunit, configured to determine a second similarity between the first structured query statement and the second structured query statement based on a matching result of a root node in the second abstract syntax tree, a weight corresponding to the matching result of the root node, a matching result of a child node of the root node, and a weight corresponding to the matching result of the child node of the root node; and a twelfth determination subunit, configured to determine the statement similarity between the first structured query statement and the second structured query statement based on the first similarity and the second similarity.

In a possible implementation, the twelfth determination subunit is specifically configured to:

take an average similarity of the first similarity and the second similarity as the statement similarity between the first structured query statement and the second structured query statement;

or take the first similarity as a precision, take the second similarity as a recall, calculate an $F_{\beta1}$ score, and determine the statement similarity between the first structured query statement and the second structured query statement based on the $F_{\beta1}$ score.

Based on the implementations provided in the foregoing aspects of the present disclosure, further combination may be performed to provide more implementations.

It should be noted that specific implementations of the units in this embodiment may refer to related descriptions in the foregoing method embodiment. The division of the units in this embodiment of the present disclosure is schematic, and is merely a logical function division. Another division manner may be used during actual implementation. The functional units in this embodiment of the present disclosure may be integrated into one processing unit, or each of the units may exist alone physically, or two or more units may be integrated into one unit. For example, in the foregoing embodiment, the processing unit and the transmitting unit may be the same unit, or may be different units. The foregoing integrated unit may be implemented in a form of hardware, or may be implemented in a form of a software functional unit.

Based on the structured query statement similarity detection method provided in the foregoing method embodiments, the present disclosure further provides an electronic device. The electronic device includes: one or more processors, and a storage apparatus. One or more programs are stored on the storage apparatus, and when the one or more programs are executed by the one or more processors, the one or more processors are enabled to implement the structured query statement similarity detection method according to any one of the foregoing embodiments.

Figure 8:
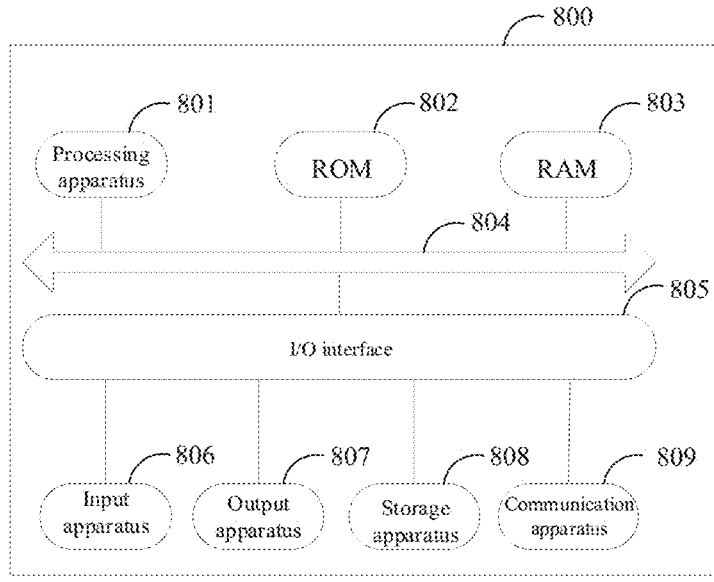
FIG. 8 is a schematic diagram of a basic structure of an electronic device according to an embodiment of the present disclosure.

Referring to FIG. 8 below, FIG. 8 is a schematic diagram of a structure of an electronic device 800 suitable for implementing an embodiment of the present disclosure. The terminal device in this embodiment of the present disclosure may include, but is not limited to, mobile terminals such as a mobile phone, a notebook computer, a digital broadcast receiver, a personal digital assistant (PDA), a portable android device (PAD), and a portable media player (PMP), vehicle-mounted terminals (such as vehicle navigation terminals) or the like; and fixed terminals such as a digital TV (television), a desktop computer, or the like. The electronic device shown in FIG. 8 is merely an example, and shall not impose any limitation on a function and a scope of use of the embodiment of the present disclosure.

As shown in FIG. 8, the electronic device 800 may include a processing apparatus (for example, a central processor, a graphics processor, or the like) 801 that may perform various suitable actions and processing in accordance with a program stored in a read-only memory (ROM) 802 or a program loaded from a storage apparatus 808 into a random access memory (RAM) 803. The RAM 803 further stores various programs and data required for an operation of the electronic device 800. The processing apparatus 801, the ROM 802, and the RAM 803 are interconnected to each other through a bus 804. An input/output (I/O) interface 805 is also connected to the bus 804.

Usually, the following apparatuses may be connected to the I/O interface 805: an input apparatus 806 including, for example, a touchscreen, a touchpad, a keyboard, a mouse, a camera, a microphone, an accelerometer, and a gyroscope; an output apparatus 807 including, for example, a liquid crystal display (LCD), a loudspeaker, and a vibrator; the storage apparatus 808 including, for example, a magnetic tape and a hard disk; and a communication apparatus 809. The communication apparatus 809 may allow the electronic device 800 to be in wireless or wired communication with other devices to exchange data. Although FIG. 8 shows the electronic device 800 having various apparatuses, it should be understood that not all of the illustrated apparatuses are necessarily implemented or included. More or fewer apparatuses may be implemented or included alternatively.

In particular, according to an embodiment of the present disclosure, the process described above with reference to the flowcharts may be implemented as a computer software program. For example, some embodiments of the present disclosure include a computer program product, which includes a computer program carried by a non-transitory computer-readable medium. The computer program includes program codes for performing the methods shown in the flowcharts. In such embodiments, the computer program may be downloaded online through the communication apparatus 809 and installed, or may be installed from the storage apparatus 808, or may be installed from the ROM 802. When the computer program is executed by the processing apparatus 801, the above-mentioned functions defined in the methods of the embodiments of the present disclosure are performed.

The electronic device provided in the embodiments of the present disclosure and the structured query statement similarity detection method provided in the foregoing embodiments belong to the same inventive concept. For technical details not described in detail in this embodiment, reference may be made to the foregoing embodiments. In addition, this embodiment and the foregoing embodiment have the same beneficial effects.

Based on the structured query statement similarity detection method provided in the foregoing method embodiments, this embodiment of the present disclosure provides a computer-readable medium having a computer program stored thereon, where the program, when executed by a processor, implements the structured query statement similarity detection method according to any one of the foregoing embodiments.

It should be noted that the foregoing computer-readable medium of the present disclosure may be a computer-readable signal medium, a computer-readable storage medium, or any combination thereof. For example, the computer-readable storage medium may be, but not limited to, electric, magnetic, optical, electromagnetic, infrared, or semiconductor systems, apparatuses, or devices, or any combination thereof. More specific examples of the computer-readable storage medium may include, but is not limited to: an electrical connection with one or more wires, a portable computer disk, a hard disk, a random access memory (RAM), a read-only memory (ROM), an erasable programmable read-only memory (EPROM or flash memory), an optical fiber, a compact disk read-only memory (CD-ROM), an optical storage device, a magnetic storage device, or any suitable combination thereof. In the present disclosure, the computer-readable storage medium may be any tangible medium containing or storing a program that may be used by or in combination with an instruction execution system, apparatus, or device. In the present disclosure, the computer-readable signal medium may include a data signal propagated in a baseband or as a part of a carrier, the data signal carrying computer-readable program cod. The data signal propagating in such a manner may take a plurality of forms, including but not limited to an electromagnetic signal, an optical signal, or any suitable combination thereof. The computer-readable signal medium may also be any other computer-readable medium than the computer-readable storage medium. The computer-readable signal medium may send, propagate, or transmit a program used by or in combination with an instruction execution system, apparatus, or device. The program code contained in the computer-readable medium may be transmitted by any suitable medium, including but not limited to: electric wires, fiber-optic cables, radio frequency (RF), and the like, or any suitable combination thereof.

In some implementations, the client and the server may communicate by using any currently known or future-developed network protocol such as a hypertext transfer protocol (HTTP), and may be interconnected to digital data communication (for example, a communication network) in any form or medium. Examples of the communication network include a local area network ("LAN"), a wide area network ("WAN"), an internetwork (for example, the Internet), and an end-to-end network (for example, an ad hoc end-to-end network), as well as any currently known or future-developed network.

The foregoing computer-readable medium may be included in the foregoing electronic device; or may also exist independently, without being assembled into the electronic device.

The foregoing computer-readable medium carries one or more programs, and when the one or more programs are executed by the electronic device, the electronic device is enabled to perform the structured query statement similarity detection method.

The computer program code for performing operations of the present disclosure may be written in one or more programming languages or a combination thereof, where the programming languages include, but are not limited to, an object-oriented programming language, such as Java, Smalltalk, and C++, and further include conventional procedural programming languages, such as "C" programming language or similar programming languages. The program code may be executed entirely on a computer of a user, partially executed on a computer of a user, executed as a stand-alone software package, partially executed on a computer of a user and partially executed on a remote computer, or executed entirely on the remote computer or server. In the scenario related to the remote computer, the remote computer may be connected to the computer of the user over any type of network, including a local area network (LAN) or a wide area network (WAN), or the connection may be made to an external computer (for example, through the Internet using an Internet service provider).

The flowcharts and block diagrams in the accompanying drawings illustrate the architecture, functionality, and operation of possible implementations of the systems, methods, and computer program products according to various embodiments of the present disclosure. In this regard, each block in the flowchart or block diagram may represent a module, a program segment, or a part of codes, including one or more executable instructions for implementing specified logical functions. It should also be noted that, in some alternative implementations, the functions noted in the blocks may also occur out of the order noted in the accompanying drawings. For example, two blocks shown in succession can actually be performed substantially concurrently, or they can sometimes be performed in a reverse order, depending on a functionality involved. It should also be noted that each block in the block diagram and/or the flowchart, and a combination of the blocks in the block diagram and/or the flowchart may be implemented by a dedicated hardware-based system that performs the specified functions or operations, or may be implemented by a combination of dedicated hardware and computer instructions.

The units involved in the embodiments of the present disclosure may be implemented in software, or may be implemented in hardware. The name of a unit/module does not constitute a limitation on the unit itself under certain circumstances. For example, a voice data acquisition module may also be described as a "data acquisition module".

The functions described above herein may be performed, at least in part, by one or more hardware logic components. For example, without limitation, exemplary types of hardware logic components that may be used include: a field programmable gate array (FPGA), an application-specific integrated circuit (ASIC), an application-specific standard product (ASSP), a system on chip (SOC), a complex programmable logic device (CPLD), and the like.

In the context of the present disclosure, a machine-readable medium may be a tangible medium that may contain or store a program for use by or in combination with an instruction execution system, apparatus, or device. The machine-readable medium may be a machine-readable signal medium or a machine-readable storage medium. The machine-readable medium may include, but is not limited to, electronic, magnetic, optical, electromagnetic, infrared, or semiconductor systems, apparatuses, or devices, or any suitable combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

It should be noted that in the present specification, the embodiments are described in a progressive manner, and each embodiment focuses on differences from other embodiments. The same or similar parts between the embodiments may be referred to each other. For a system or apparatus disclosed in the embodiments, since it corresponds to a method disclosed in the embodiments, the description is relatively simple, and for related parts, reference may be made to the description of the method section.

It should be understood that in the present disclosure, "at least one item" means one or more items, and "a plurality of items" means two or more items. "And/or" is used to describe an association relationship between associated objects, and indicates that there may be three relationships. For example, "A and/or B" may indicate the following three cases: only A exists, only B exists, and both A and B exist, where A and B may be singular or plural. The character "/" generally indicates an "or" relationship between the associated objects. "At least one of the following items (at least one of the following)" or a similar expression thereof indicates any combination of these items, including any combination of a single item (singular) or a plurality of items (plural). For example, at least one of a, b, or c may indicate: a, b, c, "a and b", "a and c", "b and c", or "a and b and c", where a, b, and c may be singular or plural.

It should further be noted that in the present specification, relational terms such as first and second are merely used to distinguish one entity or operation from another entity or operation, and do not necessarily require or imply any such actual relationship or order between these entities or operations. Moreover, the term "include", "comprise" or any other variant thereof is intended to cover a non-exclusive inclusion, so that a process, a method, a product or a device that includes a list of elements not only includes those elements, but also includes other elements not explicitly listed, or further includes elements inherent to such a process, method, product or device. Without more restrictions, an element defined by a sentence "include one . . . " does not exclude the existence of another same element in a process, method, product or device that includes the element.

The steps of the method or algorithm described in connection with the embodiments disclosed herein may be directly implemented in hardware, a software module executed by a processor, or a combination thereof. The software module may be placed in a random access memory (RAM), a memory, a read-only memory (ROM), an electrically programmable ROM, an electrically erasable programmable ROM, a register, a hard disk, a removable disk, a CD-ROM, or any other form of storage medium known in the art.

The foregoing descriptions of the disclosed embodiments enable those skilled in the art to implement or use the present disclosure. Various modifications to these embodiments are apparent to those skilled in the art, and the general principles defined herein may be implemented in other embodiments without departing from the spirit or scope of the present disclosure. Therefore, the present disclosure is not intended to be limited to the embodiments shown herein, but is to comply with the widest scope consistent with the principles and novel features disclosed herein.

The invention claimed is:

1. A method for tuning a large language model using a structured query statement similarity detection process, the method comprising:

using the large language model, performing a task to develop structured query language statements, wherein the developed structured language statements comprise a first structured query statement and a second structured query statement;

detecting a quality of the developed structured query language statements by:

acquiring the first structured query statement and the second structured query statement, and constructing, by a processor, a first abstract syntax tree of the first structured query statement and a second abstract syntax tree of the second structured query statement; an abstract syntax tree being used for representing an abstract syntax structure of a structured query statement, and a correlation degree between a root node in the abstract syntax tree and a query result of the structured query statement being higher than a correlation degree between other nodes and the query result of the structured query statement, wherein the first structured query statement and the second structured query statement are structured query statements for which a similarity detection is to be performed, wherein both the first structured query statement and the second structured query statement comprise a plurality of syntax structures, and wherein the plurality of syntax structures comprises a variable, a function, a keyword, a table name, a column name, a condition, an operator, or a subquery;

traversing, by the processor, a node in the first abstract syntax tree, matching the traversed node with a node at a same level in the second abstract syntax tree, and obtaining a matching result of the node in the first abstract syntax tree; the matching result of the node in the first abstract syntax tree indicating whether there is a node at the same level in the second abstract syntax tree that is matched with the node in the first abstract syntax tree, wherein in response to the matching result indicating a matching, a syntax structure represented by the node in the first structured query statement is semantically similar as a syntax structure represented by the matched node at the same level in the second structured query statement; and determining a statement similarity between the first structured query statement and the second structured query statement based on a matching result of a root node in the first abstract syntax tree, a weight corresponding to the matching result of the root node in the first abstract syntax tree, a matching result of a child node of the root node in the first abstract syntax tree, and a weight corresponding to the matching result of the child node of the root node in the first abstract syntax tree, wherein different weights are assigned to the matching result of the root node in the first abstract syntax tree and the matching result of the child node of the root node in the first abstract syntax tree, respectively; and tuning a hyperparameter of the large language model based on the detected quality of the developed structured query language statements.

2. The method according to claim 1, wherein the traversing a node in the first abstract syntax tree, matching the traversed node with a node at a same level in the second abstract syntax tree, and obtaining a matching result of the node in the first abstract syntax tree comprises:

traversing the node in the first abstract syntax tree hierarchically according to a bottom-up hierarchical structure of the first abstract syntax tree;

determining a first node that is traversed in the first abstract syntax tree and a second node that is at a same level as the first node in the second abstract syntax tree;

determining whether a node type of the first node is the same as a node type of the second node and whether a node attribute value of the first node and a node attribute value of the second node satisfy an attribute value matching rule, and obtaining the matching result of the first node according to a determination result; and comparing a plurality of matching results of the first node when there is a plurality of second nodes, and re-determining the matching result of the first node.

3. The method according to claim 2, wherein after the obtaining the matching result of the first node according to a determination result, and before the comparing a plurality of matching results of the first node when there is a plurality of second nodes and re-determining the matching result of the first node, the method further comprises:

determining a first child node at a level adjacent to the first node, and a second child node at a level adjacent to the second node; the second child node being at a same level as the first child node;

determining whether a node type of the first child node is the same as a node type of the second child node and whether a node attribute value of the first child node and a node attribute value of the second child node satisfy an attribute value matching rule, and obtaining a matching result of the first child node according to a determination result; and re-determining the matching result of the first node based on the matching result of the first node, a weight corresponding to the matching result of the first node, the matching result of the first child node, and a weight corresponding to the matching result of the child node of the first node.

4. The method according to claim 3, wherein the re-determining the matching result of the first node based on the matching result of the first node, a weight corresponding to the matching result of the first node, the matching result of the first child node, and a weight corresponding to the matching result of the child node of the first node comprises:

determining a score of the first node based on the matching result of the first node;

determining a score of the first child node based on the matching result of the first child node;

when there is a plurality of first child nodes, determining an average value of scores of the plurality of first child nodes as a score of the child node of the first node;

performing weighted summation on the score of the first node, the weight corresponding to the matching result of the first node, the score of the child node of the first node, and the weight corresponding to the matching result of the child node of the first node, to re-obtain the score of the first node; and determining the matching result of the first node based on the score of the first node.

5. The method according to claim 2, wherein the attribute value matching rule is that a node attribute value of the first node is the same as a node attribute value of the second node or the node attribute value of the first node is semantically the same as the node attribute value of the second node.

6. The method according to claim 1, wherein each node in the abstract syntax tree has a node type and a node attribute value corresponding thereto; and the determining a statement similarity between the first structured query statement and the second structured query statement based on a matching result of a root node in the first abstract syntax tree, a weight corresponding to the matching result of the root node, a matching result of a child node of the root node, and a weight corresponding to the matching result of the child node of the root node comprises:

determining a score of the root node in the first abstract syntax tree based on the matching result of the root node in the first abstract syntax tree;

determining a score of a child node at an adjacent level of the root node based on a matching result of the child node at the adjacent level of the root node, and determining an average value of scores of a plurality of child nodes at the adjacent level as a score of the child node of the root node;

performing weighted summation on the score of the root node, the weight corresponding to the matching result of the root node, the score of the child node of the root node, and the weight corresponding to the matching result of the child node of the root node, to re-obtain the score of the root node; and determining the statement similarity between the first structured query statement and the second structured query statement based on the score of the root node;

wherein when a node attribute value corresponding to the root node is empty, the weight corresponding to the matching result of the root node is 0, and the weight corresponding to the matching result of the child node of the root node is 1.

7. The method according to claim 1, wherein the determining a statement similarity between the first structured query statement and the second structured query statement based on a matching result of a root node in the first abstract syntax tree, a weight corresponding to the matching result of the root node, a matching result of a child node of the root node, and a weight corresponding to the matching result of the child node of the root node comprises:

determining a first similarity between the first structured query statement and the second structured query statement based on the matching result of the root node in the first abstract syntax tree, the weight corresponding to the matching result of the root node, the matching result of the child node of the root node, and the weight corresponding to the matching result of the child node of the root node;

traversing a node in the second abstract syntax tree, matching the traversed node with a node at a same level in the first abstract syntax tree, and obtaining a matching result of the node in the second abstract syntax tree; the matching result of the node in the second abstract syntax tree indicating whether there is a node at the same level in the first abstract syntax tree that is matched with the node in the second abstract syntax tree;

determining a second similarity between the first structured query statement and the second structured query statement based on a matching result of a root node in the second abstract syntax tree, a weight corresponding to the matching result of the root node, a matching result of a child node of the root node, and a weight corresponding to the matching result of the child node of the root node; and determining the statement similarity between the first structured query statement and the second structured query statement based on the first similarity and the second similarity.

8. The method according to claim 7, wherein the determining the statement similarity between the first structured query statement and the second structured query statement based on the first similarity and the second similarity comprises:

taking an average similarity of the first similarity and the second similarity as the statement similarity between the first structured query statement and the second structured query statement; or taking the first similarity as a precision, taking the second similarity as a recall, calculating a $F_{\beta 1}$ score, and determining the statement similarity between the first structured query statement and the second structured query statement based on the $F_{\beta 1}$ score.

9. An electronic device, comprising:

one or more processors; and a storage apparatus having one or more programs stored thereon, wherein, when the one or more programs are executed by the one or more processors, the one or more processors implement a method for tuning a large language model using a structured query statement similarity detection process, the method, comprising:

using the large language model, performing a task to develop structured query language statements, wherein the developed structured language statements comprise a first structured query statement and a second structured query statement;

detecting a quality of the developed structured query language statements by:

acquiring the first structured query statement and the second structured query statement, and constructing, by a processor, a first abstract syntax tree of the first structured query statement and a second abstract syntax tree of the second structured query statement; an abstract syntax tree being used for representing an abstract syntax structure of a structured query statement, and a correlation degree between a root node in the abstract syntax tree and a query result of the structured query statement being higher than a correlation degree between other nodes and the query result of the structured query statement, wherein the first structured query statement and the second structured query statement are structured query statements for which a similarity detection is to be performed, wherein both the first structured query statement and the second structured query statement comprise a plurality of syntax structures, and wherein the plurality of syntax structures comprises a variable, a function, a keyword, a table name, a column name, a condition, an operator, or a subquery;

traversing, by the processor, a node in the first abstract syntax tree, matching the traversed node with a node at a same level in the second abstract syntax tree, and obtaining a matching result of the node in the first abstract syntax tree; the matching result of the node in the first abstract syntax tree indicating whether there is a node at the same level in the second abstract syntax tree that is matched with the node in the first abstract syntax tree, wherein in response to the matching result indicating a matching, a syntax structure represented by the node in the first structured query statement is semantically similar as a syntax structure represented by the matched node at the same level in the second structured query statement; and determining a statement similarity between the first structured query statement and the second structured query statement based on a matching result of a root node in the first abstract syntax tree, a weight corresponding to the matching result of the root node in the first abstract syntax tree, a matching result of a child node of the root node in the first abstract syntax tree, and a weight corresponding to the matching result of the child node of the root node in the first abstract syntax tree, wherein different weights are assigned to the matching result of the root node in the first abstract syntax tree and the matching result of the child node of the root node in the first abstract syntax tree, respectively, and tuning a hyperparameter of the large language model based on the detected quality of the developed structured query language statements.

10. A non-transitory computer-readable storage medium, having a computer program stored thereon, wherein, when the computer program is executed by a processor, the processor performs a method for tuning a large language model using a structured query statement similarity detection process, the method comprising:

using the large language model, performing a task to develop structured query language statements, wherein the developed structured language statements comprise a first structured query statement and a second structured query statement;

detecting a quality of the developed structured query language statements by:

acquiring the first structured query statement and the second structured query statement, and constructing, by the processor, a first abstract syntax tree of the first structured query statement and a second abstract syntax tree of the second structured query statement; an abstract syntax tree being used for representing an abstract syntax structure of a structured query statement, and a correlation degree between a root node in the abstract syntax tree and a query result of the structured query statement being higher than a correlation degree between other nodes and the query result of the structured query statement, wherein the first structured query statement and the second structured query statement are structured query statements for which a similarity detection is to be performed, wherein both the first structured query statement and the second structured query statement comprise a plurality of syntax structures, and wherein the plurality of syntax structures comprises a variable, a function, a keyword, a table name, a column name, a condition, an operator, or a subquery;

traversing, by the processor, a node in the first abstract syntax tree, matching the traversed node with a node at a same level in the second abstract syntax tree, and obtaining a matching result of the node in the first abstract syntax tree; the matching result of the node in the first abstract syntax tree indicating whether there is a node at the same level in the second abstract syntax tree that is matched with the node in the first abstract syntax tree, wherein in response to the matching result indicating a matching, a syntax structure represented by the node in the first structured query statement is semantically similar as a syntax structure represented by the matched node at the same level in the second structured query statement; and determining a statement similarity between the first structured query statement and the second structured query statement based on a matching result of a root node in the first abstract syntax tree, a weight corresponding to the matching result of the root node in the first abstract syntax tree, a matching result of a child node of the root node in the first abstract syntax tree, and a weight corresponding to the matching result of the child node of the root node in the first abstract syntax tree, wherein different weights are assigned to the matching result of the root node in the first abstract syntax tree and the matching result of the child node of the root node in the first abstract syntax tree, respectively, and tuning a hyperparameter of the large language model based on the detected quality of the developed structured query language statements.

11. The electronic device according to claim 9, wherein the traversing a node in the first abstract syntax tree, matching the traversed node with a node at a same level in the second abstract syntax tree, and obtaining a matching result of the node in the first abstract syntax tree comprises:

traversing the node in the first abstract syntax tree hierarchically according to a bottom-up hierarchical structure of the first abstract syntax tree;

determining a first node that is traversed in the first abstract syntax tree and a second node that is at a same level as the first node in the second abstract syntax tree;

determining whether a node type of the first node is the same as a node type of the second node and whether a node attribute value of the first node and a node attribute value of the second node satisfy an attribute value matching rule, and obtaining the matching result of the first node according to a determination result; and comparing a plurality of matching results of the first node when there is a plurality of second nodes, and re-determining the matching result of the first node.

12. The electronic device according to claim 11, wherein after the obtaining the matching result of the first node according to a determination result, and before the comparing a plurality of matching results of the first node when there is a plurality of second nodes and re-determining the matching result of the first node, the method further comprises:

determining a first child node at a level adjacent to the first node, and a second child node at a level adjacent to the second node; the second child node being at a same level as the first child node;

determining whether a node type of the first child node is the same as a node type of the second child node and whether a node attribute value of the first child node and a node attribute value of the second child node satisfy an attribute value matching rule, and obtaining a matching result of the first child node according to a determination result; and re-determining the matching result of the first node based on the matching result of the first node, a weight corresponding to the matching result of the first node, the matching result of the first child node, and a weight corresponding to the matching result of the child node of the first node.

13. The electronic device according to claim 12, wherein the re-determining the matching result of the first node based on the matching result of the first node, a weight corresponding to the matching result of the first node, the matching result of the first child node, and a weight corresponding to the matching result of the child node of the first node comprises:

determining a score of the first node based on the matching result of the first node;

determining a score of the first child node based on the matching result of the first child node;

when there is a plurality of first child nodes, determining an average value of scores of the plurality of first child nodes as a score of the child node of the first node;

performing weighted summation on the score of the first node, the weight corresponding to the matching result of the first node, the score of the child node of the first node, and the weight corresponding to the matching result of the child node of the first node, to re-obtain the score of the first node; and determining the matching result of the first node based on the score of the first node.

14. The electronic device according to claim 11, wherein the attribute value matching rule is that a node attribute value of the first node is the same as a node attribute value of the second node or the node attribute value of the first node is semantically the same as the node attribute value of the second node.

15. The electronic device according to claim 9, wherein each node in the abstract syntax tree has a node type and a node attribute value corresponding thereto; and the determining a statement similarity between the first structured query statement and the second structured query statement based on a matching result of a root node in the first abstract syntax tree, a weight corresponding to the matching result of the root node, a matching result of a child node of the root node, and a weight corresponding to the matching result of the child node of the root node comprises:

determining a score of the root node in the first abstract syntax tree based on the matching result of the root node in the first abstract syntax tree;

determining a score of a child node at an adjacent level of the root node based on a matching result of the child node at the adjacent level of the root node, and determining an average value of scores of a plurality of child nodes at the adjacent level as a score of the child node of the root node;

performing weighted summation on the score of the root node, the weight corresponding to the matching result of the root node, the score of the child node of the root node, and the weight corresponding to the matching result of the child node of the root node, to re-obtain the score of the root node; and determining the statement similarity between the first structured query statement and the second structured query statement based on the score of the root node;

wherein when a node attribute value corresponding to the root node is empty, the weight corresponding to the matching result of the root node is 0, and the weight corresponding to the matching result of the child node of the root node is 1.

16. The electronic device according to claim 9, wherein the determining a statement similarity between the first structured query statement and the second structured query statement based on a matching result of a root node in the first abstract syntax tree, a weight corresponding to the matching result of the root node, a matching result of a child node of the root node, and a weight corresponding to the matching result of the child node of the root node comprises:

determining a first similarity between the first structured query statement and the second structured query statement based on the matching result of the root node in the first abstract syntax tree, the weight corresponding to the matching result of the root node, the matching result of the child node of the root node, and the weight corresponding to the matching result of the child node of the root node;

traversing a node in the second abstract syntax tree, matching the traversed node with a node at a same level in the first abstract syntax tree, and obtaining a matching result of the node in the second abstract syntax tree; the matching result of the node in the second abstract syntax tree indicating whether there is a node at the same level in the first abstract syntax tree that is matched with the node in the second abstract syntax tree;

determining a second similarity between the first structured query statement and the second structured query statement based on a matching result of a root node in the second abstract syntax tree, a weight corresponding to the matching result of the root node, a matching result of a child node of the root node, and a weight corresponding to the matching result of the child node of the root node; and determining the statement similarity between the first structured query statement and the second structured query statement based on the first similarity and the second similarity.

17. The electronic device according to claim 16, wherein the determining the statement similarity between the first structured query statement and the second structured query statement based on the first similarity and the second similarity comprises:

taking an average similarity of the first similarity and the second similarity as the statement similarity between the first structured query statement and the second structured query statement; or taking the first similarity as a precision, taking the second similarity as a recall, calculating a $F_{\beta 1}$ score, and determining the statement similarity between the first structured query statement and the second structured query statement based on the $F_{\beta 1}$ score.

18. The non-transitory computer-readable storage medium according to claim 10, wherein the traversing a node in the first abstract syntax tree, matching the traversed node with a node at a same level in the second abstract syntax tree, and obtaining a matching result of the node in the first abstract syntax tree comprises:

traversing the node in the first abstract syntax tree hierarchically according to a bottom-up hierarchical structure of the first abstract syntax tree;

determining a first node that is traversed in the first abstract syntax tree and a second node that is at a same level as the first node in the second abstract syntax tree;

determining whether a node type of the first node is the same as a node type of the second node and whether a node attribute value of the first node and a node attribute value of the second node satisfy an attribute value matching rule, and obtaining the matching result of the first node according to a determination result; and comparing a plurality of matching results of the first node when there is a plurality of second nodes, and re-determining the matching result of the first node.

19. The non-transitory computer-readable storage medium according to claim 10, wherein each node in the abstract syntax tree has a node type and a node attribute value corresponding thereto; and the determining a statement similarity between the first structured query statement and the second structured query statement based on a matching result of a root node in the first abstract syntax tree, a weight corresponding to the matching result of the root node, a matching result of a child node of the root node, and a weight corresponding to the matching result of the child node of the root node comprises:

determining a score of the root node in the first abstract syntax tree based on the matching result of the root node in the first abstract syntax tree;

determining a score of a child node at an adjacent level of the root node based on a matching result of the child node at the adjacent level of the root node, and determining an average value of scores of a plurality of child nodes at the adjacent level as a score of the child node of the root node;

performing weighted summation on the score of the root node, the weight corresponding to the matching result of the root node, the score of the child node of the root node, and the weight corresponding to the matching result of the child node of the root node, to re-obtain the score of the root node; and determining the statement similarity between the first structured query statement and the second structured query statement based on the score of the root node;

wherein when a node attribute value corresponding to the root node is empty, the weight corresponding to the matching result of the root node is 0, and the weight corresponding to the matching result of the child node of the root node is 1.

20. The non-transitory computer-readable storage medium according to claim 10, wherein the determining a statement similarity between the first structured query statement and the second structured query statement based on a matching result of a root node in the first abstract syntax tree, a weight corresponding to the matching result of the root node, a matching result of a child node of the root node, and a weight corresponding to the matching result of the child node of the root node comprises:

determining a first similarity between the first structured query statement and the second structured query statement based on the matching result of the root node in the first abstract syntax tree, the weight corresponding to the matching result of the root node, the matching result of the child node of the root node, and the weight corresponding to the matching result of the child node of the root node;

traversing a node in the second abstract syntax tree, matching the traversed node with a node at a same level in the first abstract syntax tree, and obtaining a matching result of the node in the second abstract syntax tree; the matching result of the node in the second abstract syntax tree indicating whether there is a node at the same level in the first abstract syntax tree that is matched with the node in the second abstract syntax tree;

determining a second similarity between the first structured query statement and the second structured query statement based on a matching result of a root node in the second abstract syntax tree, a weight corresponding to the matching result of the root node, a matching result of a child node of the root node, and a weight corresponding to the matching result of the child node of the root node; and determining the statement similarity between the first structured query statement and the second structured query statement based on the first similarity and the second similarity.

* * * * *